(12) United States Patent
Collins et al.

(10) Patent No.: US 8,557,115 B2
(45) Date of Patent: Oct. 15, 2013

(54) DUAL STAGE ULTRAFILTER DEVICES IN THE FORM OF PORTABLE FILTER DEVICES, SHOWER DEVICES, AND HYDRATION

(75) Inventors: Gregory R. Collins, Monroe, NY (US); James Summerton, Park Ridge, NJ (US); Norman Barta, Fairlawn, NJ (US)

(73) Assignee: Nephros, Inc., New York, NY (US)

( * ) Notice: Subject to any disclaimer, the term of this patent is extended or adjusted under 35 U.S.C. 154(b) by 0 days.

(21) Appl. No.: 13/469,535

(22) Filed: May 11, 2012

(65) Prior Publication Data

US 2012/0261315 A1    Oct. 18, 2012

Related U.S. Application Data

(62) Division of application No. 12/454,361, filed on May 15, 2009, which is a division of application No. 11/469,261, filed on Aug. 31, 2006, now Pat. No. 7,534,349.

(60) Provisional application No. 60/714,058, filed on Sep. 2, 2005, provisional application No. 60/809,648, filed on May 30, 2006.

(51) Int. Cl.
*B01D 63/02* (2006.01)

(52) U.S. Cl.
USPC ............ 210/321.9; 210/321.89; 210/336; 210/473; 210/136

(58) Field of Classification Search
None
See application file for complete search history.

(56) References Cited

U.S. PATENT DOCUMENTS

| | | | |
|---|---|---|---|
| 4,772,390 A * | 9/1988 | Kawai et al. | 210/651 |
| 6,719,907 B2 * | 4/2004 | Collins et al. | 210/646 |
| 2005/0000883 A1 * | 1/2005 | Kouters et al. | 210/321.89 |
| 2009/0078625 A1 * | 3/2009 | Palumbo et al. | 210/94 |

* cited by examiner

*Primary Examiner* — Krishnan S Menon
(74) *Attorney, Agent, or Firm* — Leason Ellis, LLP

(57) ABSTRACT

The present invention is directed to an alternative compact portable filtration device that can be used in remote locations and includes a single filtration cartridge that provides redundant filtration of the fluid (water). In particular, the device is a dual stage ultrafilter cartridge (apparatus) that is constructed and designed to provide a portable device that can be used in the field, such as during camping or military assignment, and offers two filtration stages (redundant filtration) within a single housing.

9 Claims, 17 Drawing Sheets

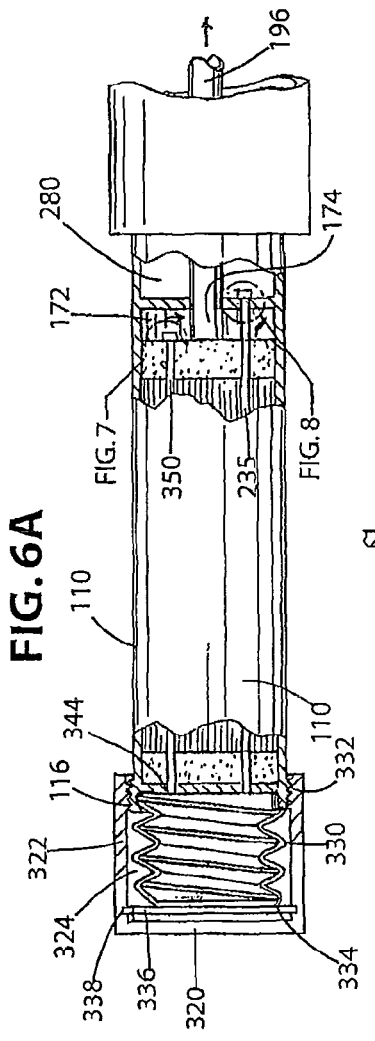
FIG. 6A
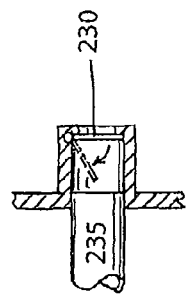
FIG. 8
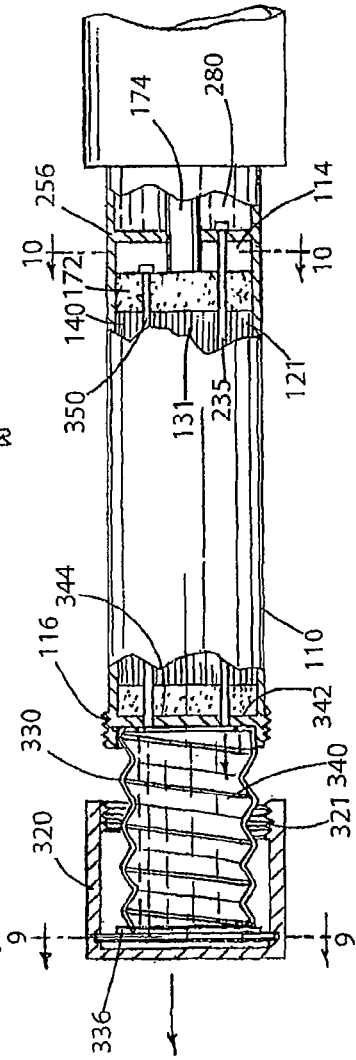
FIG. 6B
FIG. 7

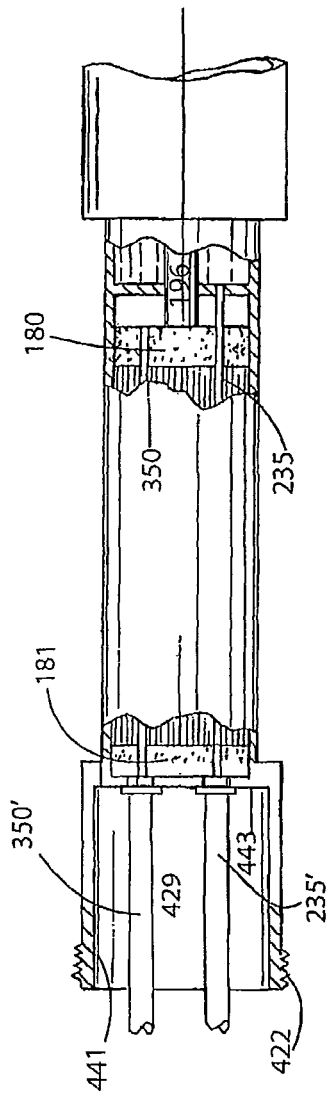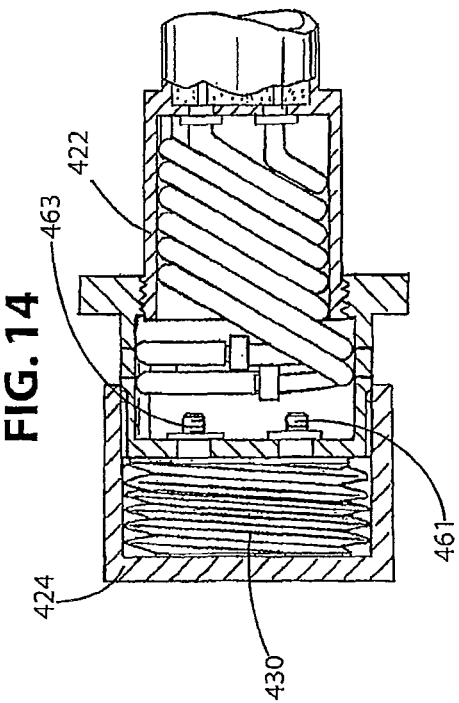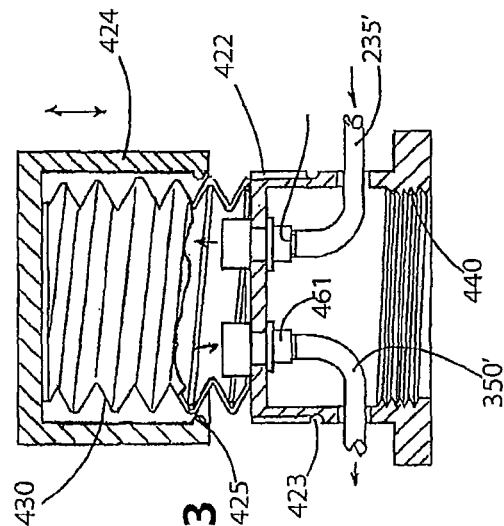

FIG. 15
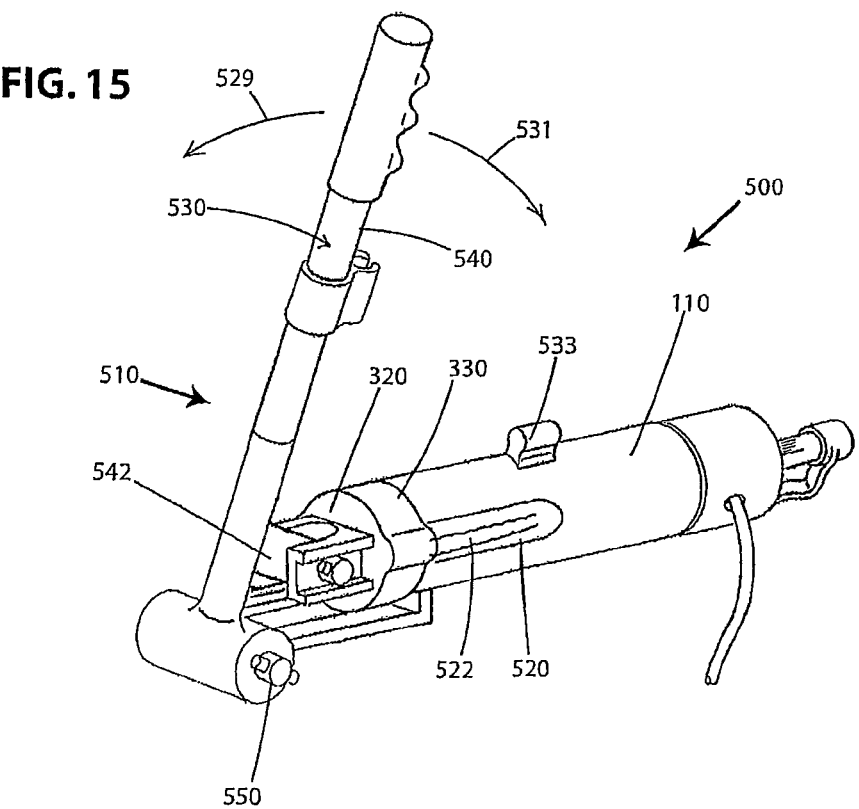
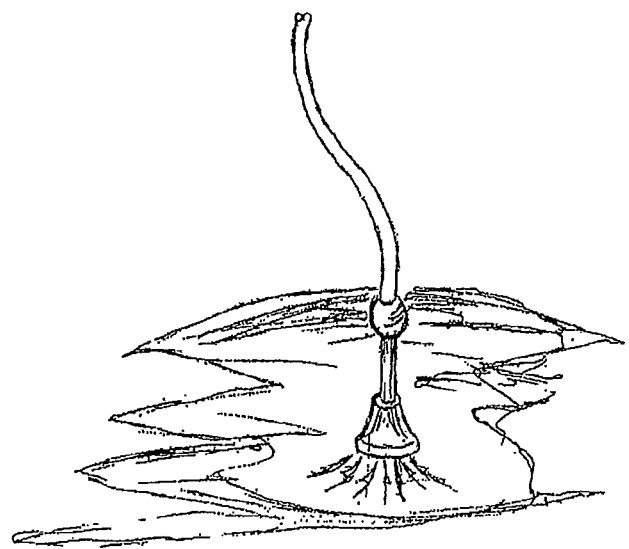

DUAL STAGE ULTRAFILTER DEVICES IN THE FORM OF PORTABLE FILTER DEVICES, SHOWER DEVICES, AND HYDRATION

CROSS-REFERENCE TO RELATED APPLICATIONS

This application is a divisional of U.S. patent application Ser. No. 12/454,361, filed May 15, 2009 which claims the benefit of U.S. patent application Ser. No. 11/469,261, filed Aug. 31, 2006; U.S. Provisional Application No. 60/714,058, filed Sep. 2, 2005; U.S. Provisional Application No. 60/763,642, filed Jan. 30, 2006 and U.S. Provisional Application No. 60/809,648, filed May 30, 2006. The content of these applications are incorporated herein by reference in their entirety.

TECHNICAL FIELD

The present invention relates to filtration devices and methods and, more particularly, to a portable filtration cartridge having redundant filtration stages for producing a sterile fluid, and in another aspect, to a wearable, mobile hydration pack or the like that contains components for storing raw water and means for purifying the raw water into purified water which can likewise be stored in the hydration pack.

DESCRIPTION OF RELATED ART

It will be appreciated by those skilled in the art that liquid (water) treatment facilities are needed in various fields which require treatment of water on site, such as at an industrial plant or the like, as well as in-field uses where it is desirable for the water to be treated at a remote location, such as during a camping trip or at a remote military location etc., where it is difficult or impossible to contain and supply potable water. For example, when camping or hiking, it is very cumbersome to carry the necessary water supply due to the sheer weight of the water itself. This makes it difficult since it is an absolute requirement for an individual to consume the necessary amounts of water to replenish fluid in the water and remain properly hydrated.

Unfortunately, access to a potable water supply may be difficult if not impossible depending upon the circumstances and the precise location. For example, when camping or when otherwise being in a natural setting, it may be unsafe to drink running water from rivers, streams, lakes, etc., since these sources may contain foreign matter, such as microorganisms, organic wastes, etc., that can at the very least lead to sickness and discomfort and at worst, can even lead to serious health concerns and even death in the most extreme situations, as when harmful chemicals or poisonous natural elements are consumed.

There are a number of governmental bodies and agencies that undertake regulating the public drinking water supply. In particular, the Environmental Protection Agency (EPA) and the Occupational Safety and Health Administration (OSHA) assure the safety and health of the public by setting and enforcing standards both outside and inside the workplace. There are a number of regulations to govern the standards that apply to water consumption and especially, public water systems. The standards protect public health by limiting the levels of contaminants in drinking water, with some common contaminants being microorganisms, organic matter, inorganic and organic chemicals, disinfection by-products, disinfectants, etc.

However and as previously mentioned, it is difficult to carry and/or generate a sufficient supply of drinking water when an individual is located in a remote location, such as the wilderness even when there is abundant water around since the water may not be potable. While there has been work done in the field of portable water treatment facilities, these facilities and systems tend to be either too complex, cumbersome and generally impractical since they most often are not that portable in design. It is therefore desirable to produce a water treatment device that is truly portable in nature and can be easily taken to a remote location due to it being compact in design.

One other field where water treatment is needed is a hemodialysis center or clinic. Simply put, hemodialysis aids a patient whose body is incapable of filtering the blood. At hemodialysis centers, it is common to include stationary and fixtured facilities to filter the water necessary to the purity necessary for hemodialysis machines.

One other field where water treatment is needed is an in-field facility, such as a military hospital or first aid clinic, that is located in a remote location, such as a combat environment or in the middle of a large federal park where the closest medical emergency facilities is many miles away. A supply of sterilized water is needed for medical treatment of a patient in addition to sterilizing instruments and the like which are used during an operative procedure.

One type of water treatment device is a wearable hydration pack that provides a mobile attempt to purify water; however, as described below, there are number of disadvantages associated with this type of device. More specifically, this type of wearable hydration pack contains a single flexible bladder; however, these devices only generally store water used for drinking. There are certain configurations of this type of product whereby one either attempts to purify water that is placed into the single bladder or attempts to purify the water as it leaves the bladder just before drinking it. These configurations present certain difficulties that are overcome by the present invention as described in detail below. For example, for the case where one needs to purify water from an un-purified or unpalatable water source before adding it to the single flexible bladder, the user would need to remain at the source of un-purified water and run it through the purifying filter until it is full. If the user is in a remote or dangerous location, such as in a military operation, it may be unsafe to remain at this water source for an extended period of time. For the case where one fills the bladder with un-purified water and relies on a purification device at the outlet of the bladder, the user is limited to the output of the purification device when drinking the water. In addition, if the water contains bacteria and other water-borne organisms, a biofilm can develop inside the bladder.

As previously mentioned, there are a number of different settings and applications where a purified fluid is needed. This includes, but is not limited to, sterile fluid for infusion, consumption, and/or bathing of patients with compromised immune systems, and further, other laboratory or industrial applications or uses where sterile fluid is required. In a number of applications, tap water from a municipality can not be used even for bathing of a patient that may have a suppressed or weakened immune system or has some other condition where particulate and other foreign matter, including bacteria, contained in the tap water can jeopardize the health of the patient.

For example, there has been a number of recent outbreaks of Legionanaires' disease that have been linked to an infected water supply and the patient coming into contact with this supply. Legionellosis is an infection caused by the genus of Gram negative bacteria *Legionella*, notably, *L. pneumophila*. *L. pneumophila* is an ubiquitous aquatic organism that thrives in warm environments and typically accounts for over 90% of Legionnaires disease. Legionellosis infection occurs after persons have breathed mists that come from a water source (e.g., air conditioning cooling towers, whirlpool spas, and showers) contaminated with *Legionella* bacteria. Persons may be exposed to these mists in hotels, workplaces, hospitals or public places. *Legionella* organisms can be found in many types of water systems. The bacteria will grow in water temperatures from 68° F. to 124° F. However, the bacteria reproduce at the greatest rate in warm, stagnant water, such as that found in certain plumbing systems and hot water tanks, cooling towers and evaporative condensers of large air-conditioning systems and whirlpool spas.

This is merely one example of a type of bacteria that can be present in water and cause health problems and in some cases be fatal when consumed or when the patient comes into contact with infected potable water. Other types of bacteria can cause stomach aliments when consumed or other undesired health issues.

In order to ensure a clean, healthy supply of water, a filter device or the like is often used to clean unwanted foreign matter from the water. Such a device will often have a filter membrane or the like that filters the water supply. In some settings where it is critical to have a sterile supply of water or the like, a redundant filtration system is provided to ensure the necessary level of safety. These types of systems include not only a first filtration stage but also a second filtration stage that acts as a redundant filtration stage since it receives filtered water from the first stage and then performs a second filtration operation on the filtered water to ensure that water discharged from the device is sterile and suitable for use.

In order for a filter to be effective in removing a given substance by size exclusion, the filter must be and must remain intact. Generally, a "filter integrity test" is performed on the filter before it is put into use. One type of test is known as a pressure test using compressed air. Some common methods include a bubble point test or pressure decay as an inspection method for testing the integrity of sterilizing filters. Air is used because air cannot cross the filter membrane except by simple diffusion. If however, the air pressure on one side of the filter membrane exceeds a certain threshold value that is sufficient to displace water from the pores of the membrane (which is held by surface tension and capillary forces), a considerable amount of air crosses the membrane. This results in a stream of bubbles appearing on the downstream side of the filter (i.e., the bubble point method) or a considerable decay in the upstream pressure (pressure decay method). It is understood that neither of these pressure integrity test methods can be used once the filter is installed where there is not a source of compressed air or if it is critical to maintain filter cleanliness, such as maintaining sterility of the product being passed through the filter.

Several different techniques have been proposed for checking the integrity of a filter; however, these techniques have associated disadvantages. More particularly, one technique involves monitoring a marker substance unable to pass through an intact membrane, while another technique includes a system with a recirculation loop for the primary side of a cross-flow filter. An injection port in this loop allows injection of a dye that can be detected by a sensor. In addition, another technique employs particles rather than a dye and measures either the appearance or the disappearance of the particles. In addition, another technique uses redundant filters with the particles in front of the first filter and the sensor between the filters. Particles will accumulate in front of the second filter if the first filter fails which enhances sensitivity.

However, each of the above techniques has associated disadvantages, with one being that the process requires either additional parts (e.g., sensors) or requires the addition of an additional substance, such as dye or particles, etc. This complicates and makes the integrity checking process more cumbersome and costly.

It will also be appreciated by those skilled in the art that liquid (water) treatment facilities are needed in various fields which require treatment of water on site, such as at an industrial plant or the like, as well as in-field uses where it is desirable for the water to be treated at a remote location, such as during a camping trip or at a remote military location etc., where it is difficult or impossible to contain and supply potable water. For example, when camping or hiking, it is very cumbersome to carry the necessary water supply due to the sheer weight of the water itself. This makes it difficult since it is an absolute requirement for an individual to consume the necessary amounts of water to replenish fluid in the body and remain properly hydrated.

Unfortunately, access to a potable water supply may be difficult, if not impossible, depending upon the circumstances and the precise location. In addition, in locations that are either remote and/or dangerous, such as a military operation, it may be difficult for a person to have the time or ability to purify a water supply. For example, when camping or when otherwise being in a natural setting, it may be unsafe to drink running water from rivers, streams, lakes, etc., since these sources may contain foreign matter, such as microorganisms, organic wastes, etc., that can at the very least lead to sickness and discomfort and at worst, can even lead to serious health concerns and even death in the most extreme situations, as when harmful chemicals or poisonous natural elements are consumed.

There are a number of governmental bodies and agencies that undertake regulating the public drinking water supply. In particular, the Environmental Protection Agency (EPA) and the Occupational Safety and Health Administration (OSHA) assure the safety and health of the public by setting and enforcing standards both outside and inside the workplace. There are a number of regulations to govern the standards that apply to water consumption and especially, public water systems. The standards protect public health by limiting the levels of contaminants in drinking water, with some common contaminants being microorganisms, organic matter, inorganic and organic chemicals, disinfection by-products, disinfectants, etc.

However and as previously mentioned, it is difficult to carry and/or generate a sufficient supply of drinking water when an individual is located in a remote location, such as the wilderness, even when there is abundant water around since the water may not be potable. While there has been work done in the field of portable water treatment facilities, these facilities and systems tend to be either too complex, cumbersome and generally impractical since they most often are not that portable in design.

There is therefore a need for a wearable, mobile hydration unit that is easily operable and overcomes the above disadvantages that are associated with the conventional wearable hydration devices.

SUMMARY

The present invention is directed to an alternative compact portable filtration device that can be used in remote locations and includes a single filtration cartridge that provides redundant filtration of the fluid (water). In particular, the device is a dual stage ultrafilter cartridge (apparatus) that is constructed and designed to provide a portable device that can be used in the field, such as during camping or military assignment, and offers two filtration stages (redundant filtration) within a single housing. Any number of different pumping mechanisms can be employed for delivering the fluid (e.g., water) from a source to the filtration stages of the cartridge. For example, a piston pump can be incorporated into the housing of the device to offer a hand held pumping mechanism, a bellows structure can be provided to offer a hand held pumping mechanism, or a foot operated pumping mechanism can be provided for controllably delivering raw, unfiltered fluid into the cartridge.

The device can include a number of other features described herein to permit the device to have a compact design for easy storage and transportation of the device. For example, a winder mechanism can be provided to wind and unwind a main fluid conduit that is placed into the source of unfiltered fluid and a storage compartment can be provided to stored unused conduits and the like when the device is not being used.

In yet another embodiment, a dual stage ultrafilter device with redundant filtration is constructed to include an integral shower head for delivering twice filtered fluid in a shower like manner.

A wearable, mobile hydration apparatus includes a body that is constructed to be worn by a person and can be in the form of a back pack or the like. The hydration apparatus includes a first fluid storage member for storing an untreated fluid and a hand operable pump mechanism for drawing the untreated fluid from the first fluid storage member. The apparatus also includes a fluid treatment device that is fluidly connected to the first fluid storage member for receiving the untreated fluid and includes elements for treating the untreated fluid to form treated water. A second fluid storage member is fluidly connected to the fluid purification device such that it receives and stores the treated water as a result of the operation of the pump mechanism.

In yet another aspect, a wearable, mobile hydration unit with dual-stage sterilization is provided and includes a flexible structure, such as a back pack or the like, constructed to be worn by a person. The hydration unit includes a first bladder for storing unsterilized, raw water that is to be treated and purified and further includes a cartridge including a housing having a first sterilization stage including first semi-permeable filtering elements and a second sterilization stage including second semi-permeable filtering elements. The housing has a first end and a second end, with the first end including a fluid inlet port that receives the raw water from the first bladder and a fluid outlet port and a member that divides the housing into the first sterilization stage and the second sterilization stage.

The fluid inlet port is in fluid communication only with the first sterilization stage, while the fluid outlet port is in fluid communication only with the second sterilization stage. The first and second semi-permeable filtering elements are sealed at the second end of the housing so as to cause the fluid entering the fluid inlet port to flow within lumen sections of the first semi-permeable filtering elements and then be filtered by being conducted across the first semi-permeable filtering elements and then subsequently being filtered again by being conducted across the second semi-permeable filtering elements and into the lumen sections of the second semi-permeable filtering elements prior to being discharged through the fluid outlet port as purified water.

A hand operable pump mechanism is provided for drawing the raw water from the first bladder and delivering it through the fluid inlet port into the first sterilization stage and a second bladder is fluidly connected to the fluid outlet port of the cartridge for receiving and storing the purified water and permitting it to be selectively discharged to the person.

In yet another aspect, a feature is provided as part of the apparatus that permits visual inspection of at least a portion of the second semi-permeable filtering elements to detect whether a breach has occurred in the first sterilization stage.

According to one embodiment, a dual stage water filtration unit includes a single cartridge having a primary sterilization stage including first semi-permeable filtering elements and a redundant sterilization stage including second semi-permeable filtering elements. The cartridge includes a fluid inlet port for receiving raw unfiltered fluid and a fluid outlet port for discharging sterilized fluid after it has passed through the primary and redundant sterilization stages. The fluid inlet port is in fluid communication only with the primary sterilization stage, while the fluid outlet port is in fluid communication only with the redundant sterilization stage, and the second semi-permeable filtering elements are located adjacent to an inner wall of the housing which is formed of a transparent or translucent material.

A visual inspection tool is coupled to an outer surface of the housing and includes a window that overlies a portion of the second semi-permeable filtering elements to permit visual inspection thereof such that a user can determine if a breach has occurred in the first sterilization stage by observing discolorization of the second semi-permeable filtering elements.

In yet another embodiment, a dual stage water filtration unit includes a single cartridge having a primary sterilization stage including first semi-permeable filtering elements and a redundant sterilization stage including second semi-permeable filtering elements. The cartridge also includes a fluid inlet port for receiving raw unfiltered fluid and a fluid outlet port for discharging sterilized fluid after it has passed through the primary and redundant sterilization stages. The fluid inlet port is in fluid communication only with the primary sterilization stage, while the fluid outlet port is in fluid communication only with the redundant sterilization stage, and the second semi-permeable filtering elements being located adjacent an inner wall of the housing.

A visual inspection tool in the form of a transparent or translucent window is formed as part of the housing and is surrounded by housing sections that are formed of an opaque material. The window overlies a portion of the second semi-permeable filtering elements to permit visual inspection thereof such that a user can determine if a breach has occurred in the first sterilization stage by observing discoloration of the second semi-permeable filtering elements.

BRIEF DESCRIPTION OF DRAWINGS

The foregoing and other features of the present invention will be more readily apparent from the following detailed description and drawings of illustrative embodiments of the invention wherein like reference numbers refer to similar elements throughout the several views and in which:

FIG. 6A is a cross-sectional view of the apparatus of FIG. 5 showing a pump mechanism in a retracted position;

FIG. 6B is a cross-sectional view of the apparatus of FIG. 5 showing the pump mechanism in an extended position;

FIG. 7 is a local cross-sectional view of a section of the apparatus of FIG. 6A;

FIG. 8 is a local cross-sectional view of another section of the apparatus of FIG. 6B;

FIG. 12 is a cross-sectional view of the apparatus of FIG. 11;

FIG. 13 is a cross-sectional view of the apparatus of FIG. 11 showing a pump mechanism in an extended position;

FIG. 14 is a cross-sectional view of the apparatus of FIG. 11 showing the pump mechanism in a retracted position;

FIG. 15 is a perspective view of a dual stage ultrafilter apparatus according to a fourth embodiment;

DETAILED DESCRIPTION OF THE PREFERRED EMBODIMENTS

Figure 1:
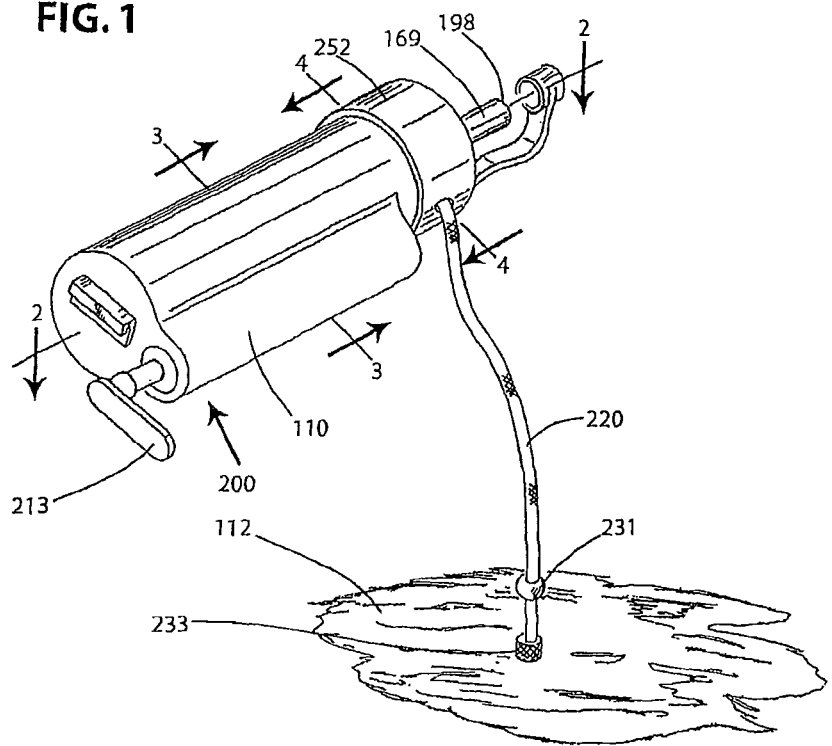
FIG. 1 is a perspective view of a dual stage ultrafilter apparatus according to a first embodiment.

In accordance with one aspect of the present invention, a dual stage ultrafilter apparatus (cartridge) 100 according to one embodiment is illustrated in FIGS. 1-4. The ultrafilter apparatus 100 is constructed and designed so that it provides a portable apparatus that is capable of providing two filtration stages (redundant filtration) within a single housing 110, as described below, and also has a means for delivering and passing the fluid to be filtered through the two filtration stages.

More specifically, the housing 110 defines a primary filtration stage 120 and a redundant filtration stage 130, with at least a portion of the housing typically being generally cylindrically shaped and containing a longitudinal bundle of semi-permeable hollow fibers 140. The semi-permeable hollow fibers 140 serve as a means for filtering out bacteria, endotoxins, and other undesirable foreign matter from the incoming fluid from source 112 resulting in a sterile quality fluid being produced after it passes through the two filtration stages 120, 130. The portable ultrafilter apparatus 100 may be used in any application where a sterile fluid is required or highly desired, including drinking water, fluid for sterilizing medical equipment, etc., bodily cleaning fluid for medical staff, on-line hemodiafiltration, etc., to name just a few exemplary applications. Any number of semi-permeable hollow fibers 140 that are commercially available for this intended purpose may be used. For example, semi-permeable hollow fibers 140 come in a variety of dimensions and can be formed of polymers, such as polysulfone, or be cellulose-based.

The dual stage ultrafilter apparatus 100 can be thought of as having a redundant filtration component, as defined by the first and second filtration stages 120, 130, a pump mechanism 210 to cause the fluid to be filtered to enter and pass through the two filtration stages 120, 130, and optionally, a storage compartment for storing a fluid conduit 220 that serves to deliver the fluid to be filtered from the source of fluid.

The redundant filtration component of the apparatus 100 is now described in detail. In the illustrated embodiment, the filtration component includes the cartridge housing 110 that contains the semi-permeable hollow fibers 140 which are arranged to define the first and second filtration stages 120, 130. For purpose of illustration only, the first and second filtration stages 120, 130 are defined by concentrically arranged hollow fibers 140. More specifically, the first filtration stage 120 includes a first set of hollow fibers 140 that are in the shape of a ring that is radially outward and circumferentially surrounding a second set of hollow fibers 140 associated with the second filtration stage 130. Thus, when the fibers bundles are separated into annular stages, a pair of concentric stages is formed.

However, the above-described arrangement of the semi-permeable hollow fibers 140 is merely exemplary in nature and the two sets of hollow fibers 140 can be arranged in any number of other arrangements including side-by-side bundles of hollow fibers which are each semi-circular in shape. Alternatively, the first set of hollow fibers 140 associated with the first filtration stage 120 can be arranged as a circular bunch of fibers arranged in the center, with the second set of hollow fibers 140 associated with the second filtration stage 130 being arranged as an annular (ring) shaped bunch of fibers that is radially outward and circumferentially surrounds the first set of hollow fibers 140. Generally speaking the number of hollow fibers 140 associated with the first filtration stage 120 is about equal to the number of hollow fibers 140 associated with the second filtration stage 130; however, this is not critical so long as a desired flow rate and filtration rate can be achieved by the arrangement of the hollow fibers 140.

A header space 170 is provided and defines a first header space 172 where the fluid to be filtered is received and routed into lumens of the first set of hollow fibers 140 of the first filtration stage 120. As described below, a second header space 174 is provided in the header space 170 to permit the twice (redundant) filtered fluid to be discharged from the apparatus 100. The first and second header spaces 172, 174 typically take the same general shape as the arrangement of the hollow fibers 140 in the first and second stages 120, 130. More specifically, when the first filtration stage 120 is defined by an outer annular shaped fiber bundle and the second filtration stage 130 is defined by an inner circular shaped fiber bundle, the first header space 172 is in the form of an annular (ring) shaped compartment that is radially outward and concentric with the second header space 174 which is in the form of a center circular shaped space.

The header space 170 is disposed closer to a first end 114 of the housing 110 compared to a second end 116 of the housing 110 and is in the form of an enclosed cavity or compartment. Both the first and second inner header spaces 172, 174 are separated from the rest of the apparatus 100 by a first potting compound 180, which forms a seal around the outside surfaces of the hollow fibers 140 at the first end 114 of the housing 110. The header space 170 can be a removable type that may be threaded onto the housing 110. The first header space 172 can be sealed from the external environment by an O-ring or the like (not shown), which seals against the first potting compound 180. It can be appreciated by one skilled in the art that the first header space 170 could also be attached permanently in this configuration as well as by several other methods, such as a snap-fit type construction.

The fluid to be filtered enters the first header space 172 through an inlet port 182 preferably in a tangential flow direction so as to more equally perfuse the first header space 172 before the fluid enters the hollow fibers 140 associated with the first filtration stage 120 at an interface 184. Interface 184, in this embodiment, is an upper surface of the first potting compound 180. Interface 184 preferably includes a polyurethane interface structure. The first header space 172 can be separated from the second header space 174 by several techniques. For example, the first header space 172 can be separated from the second header space 174 by an annular wall 188 which partitions the header space of the first header space 170 into the first and second spaces 172, 174, respectively. Preferably, the inner wall 188 is formed as an integral part of the header space 170. The inner wall 188 extends inwardly toward the fibers 140 from an inner surface of an upper portion of the header space 170. To provide a seal between the first and second header spaces 172, 174, an internal O-ring can be used and disposed at the end of the inner wall opposite to where it attaches to the header space 170. The internal O-ring provides a sealing action when the header space 170 interfaces with the interface 184.

Thus, the inner wall 188 serves to separate portions of the hollow fibers 140 into first and second sections, which correspond with the first and second filtration stages 120, 130, respectively. The separation of the hollow fibers 140 can be accomplished using a number of different techniques, including but not limited to inserting an end of the inner wall 188 or a separator into the bundle of hollow fibers 140 proximate the first end of the housing 110 prior to the potting process. In one exemplary embodiment, the separator can be in the form of an annular ring made of a suitable material, such as a plastic material. The separator divides the single cylindrical hollow fiber bundle 140 into a first fiber section 121 (referred to herein as an external fiber bundle ring) and the second fiber section 131 (referred to herein as an internal cylindrical fiber bundle) at the first ends of the fibers 140. In other words, the external fiber bundle ring 121 surrounds the internal cylindrical bundle 131. The separator may also serve a dual purpose as an O-ring seat for the internal O-ring. The external fiber bundle ring 121 fluidly communicates with the first header space 172 and the inner fiber bundle 131 fluidly communicates with the second header space 174. During the potting process, the separator may be encased in the first potting compound 180. The separator is preferably made of a relatively non-rigid plastic, such as polyethylene, that may be trimmed flush with the first potting compound 180.

Alternatively and as illustrated, when the first header space 170 is not of a removable type, the inner wall 188 that is integral to the header space 170 can serve as the separator by being merely inserted into the fiber bundles 140 prior to the potting process. There are any number of different means for separating both the first header cap space into the first and second header spaces 172, 174, as well as partitioning the fiber bundle 140 into the external fiber bundle 121 and inner fiber bundle 131 in the illustrated embodiment. For example, different means are disclosed in commonly assigned U.S. Pat. No. 6,719,907, which is hereby incorporated by reference in its entirety.

The fluid to be filtered enters the first header space 172 through the inlet port 182 which can be any type of suitable fluid connection port. Once mounted the header space 170 defines the two internal header spaces, namely, the primary first header space 172 and the secondary second header space 174. As previously mentioned, the first and second header spaces 172, 174 are segregated from a filtration space of the housing 110 by the first potting compound 180 that seals around the outside of the fibers 140 and the inside end of the housing 110. This first fiber section 121 makes up the primary filtration stage 120. The fluid flows into the fibers 140 and across the fiber membrane of each fiber 140, which effectively removes the bacteria and endotoxin and other undesired foreign matter, etc., from the fluid. All the fluid is forced across the fiber membranes since the opposite ends of the hollow fibers 140 (associated with both stages 120, 130) have been sealed off by a second potting compound 181. The fluid flowing within the first fiber section 121 is conducted across the fiber membranes 140 due to an existing pressure differential in which the area surrounding the fibers of the first fiber section 121 is at a lower pressure compared to the pressure inside of the fibers 140 of the first section 121.

The now sterile filtered fluid resides in the internal filtration space around the hollow fibers 140. The pressure within the space then moves the fluid into the fibers 140 of the second section 131. The fluid crosses the membrane of these fibers 140 into the fiber lumen (inner lumen) and is filtered a second time. As such the second fiber section 131 makes up the redundant filtration stage 130.

Twice filtered sterile fluid then exits into the second internal header space 174, through a discharge conduit 196 (which as illustrated also serves as the inner wall 188) and out of an outlet port 198. In the simplest terms, the discharge conduit 196 merely transfers twice filtered fluid from the second header space 174 to another location where the twice filtered fluid is used, etc. As a result, the discharge conduit 196 is merely some structure that confines and routes the twice filtered fluid along a flow path such that it does not come into contact with other fluids, such as the raw fluid to be filtered. In the illustrated embodiment, the discharge conduit 196 is in the form of a tube or the like that carries the twice filtered fluid from the filtration component of the apparatus 100 and away from the apparatus 100. The discharge conduit 196 can thus be a length of tube which extends outwardly from the apparatus 100 such that it terminates beyond first end 114 of the housing 110. The open end of the discharge conduit 196 can thus be positioned in relation to a container or the like which receives and stores the twice filtered fluid. The open end of the discharge conduit 196 can likewise be easily and fluidly connected to some other device which receives the twice filtered fluid, e.g., a hemodialysis machine when the twice filtered fluid is sterile infusion fluid.

The outlet port (discharge port) 198 is a lower pressure than other locations of the filter and thus, the fluid is caused to flow according to the aforementioned flow path as the fluid entering the fibers 140 of the first section 121 is conducted across two separate fiber membranes in order to flow into the second header space 174 and ultimately through the outlet port 198. The general flow of fluid in the filtration (sterilization) stages 120, 130 is depicted by the arrows. The solid arrows indicate inter-lumen fluid flow, while the broken line indicated flow between the stages 120, 130.

Optionally, the housing 110 can include one or more casing ports (not shown) which are in fluid communication with the filtration space. The casing ports are sealed during normal operation of the filter; but can be used for priming and testing of the apparatus 100. The ports can be of any type suitable for making a leak free connection and during a priming operation, sterile fluid can be pumped into the ports where it will force air out of the filtration chamber and fiber lumens 140 and eventually exit out of the two header ports 182, 198. The design allows for this advantageous methodology whereas priming via the inlet port 182 could result in trapped air in the fibers 140 due to them being plugged at one end. The ports are also used in order to detect fiber leaks, such as performing an air pressure decay test. By pumping air into the filtration chamber 125 one can advantageously test the fibers 140 of both filtration stages 120, 130 simultaneously.

Figure 5:
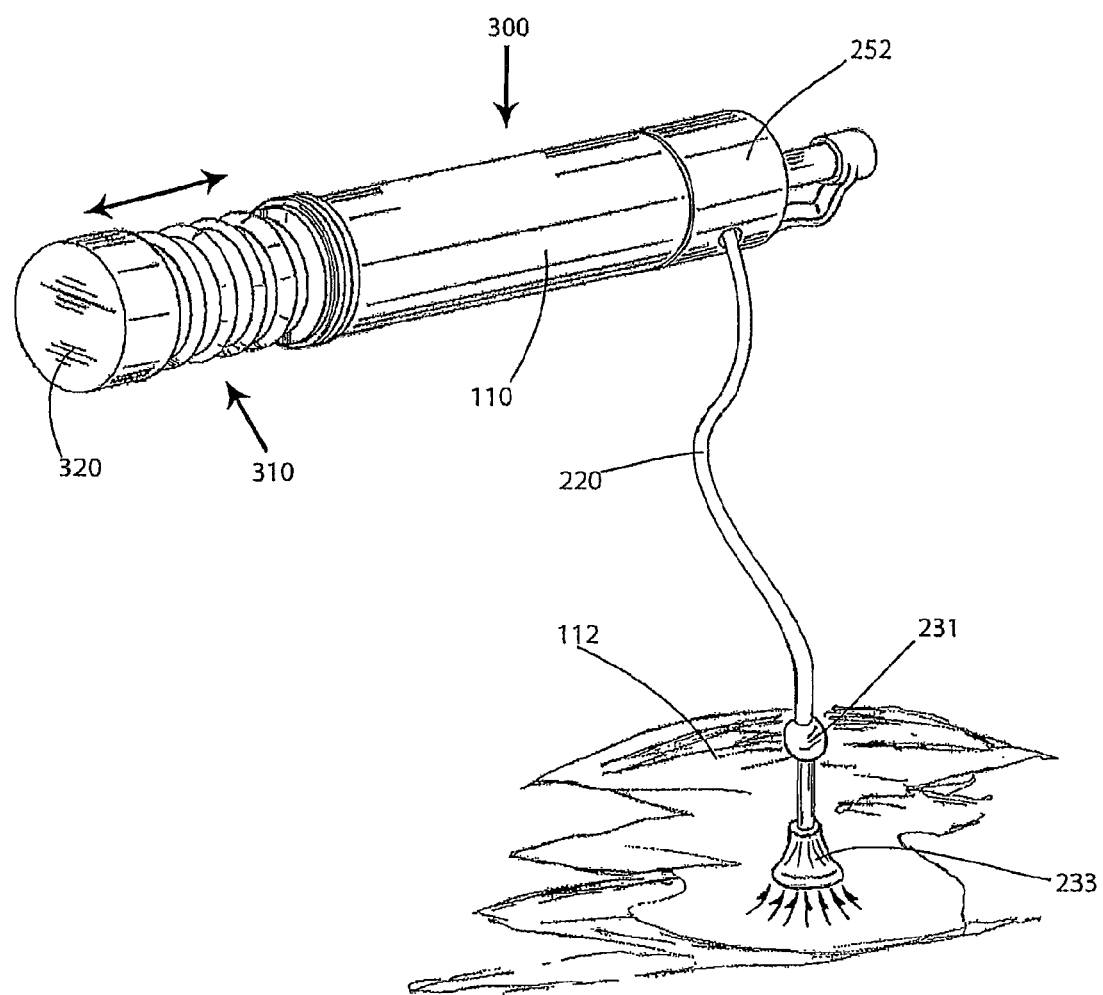
FIG. 5 is a perspective view of a dual stage ultrafilter apparatus according to a second embodiment.
Figure 9:
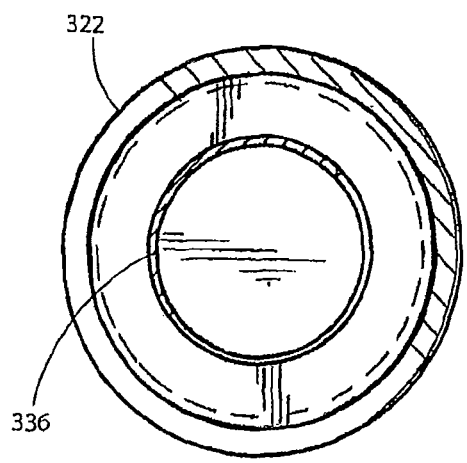
FIG. 9 is a cross-sectional view taken along the line 9-9 of FIG. 6B.
Figure 10:
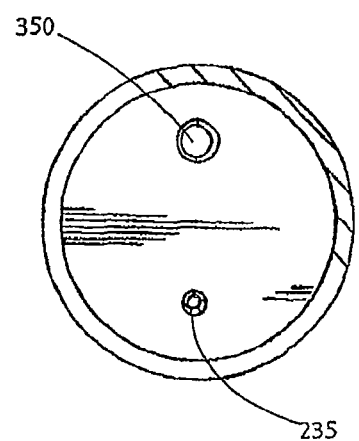
FIG. 10 is a cross-sectional view taken along the line 10-10 of FIG. 6B.

As previously mentioned, there are other means for attaching the header space 170 to the housing end. It will be appreciated by one skilled in the art that several additional methods are available as well. Some of these methods are shown in FIGS. 5-6 of the previously incorporated '907 patent.

The pump mechanism 200 of the apparatus 100 is configured to deliver raw fluid (unfiltered water) from the source 112 to the first header space 172 where it can then flow into the open fibers 140 that in fluid communication therewith and associated with the first filtration stage 120. More specifically, the first conduit 220 is in the form of a tube or the like which, under operation of the pump mechanism 200, can carry the fluid from the source 112 to a temporary fluid holding chamber 202 that forms a part of the pump mechanism 200 and is preferably integrally attached to and forms a part of the housing 110.

As will be apparent hereinafter, there a number of different pump mechanisms 200 that perform the intended function and therefore, the illustrated pump mechanisms 200 are merely exemplary in nature and not limiting in scope of the present invention. FIGS. 1-4 illustrated a pumping mechanism 200 that takes the form of a piston pump. The piston pump 200 includes an axially movable piston or plunger element 210 that is received within the holding chamber 202. Similar to a syringe structure, the piston 210 is an elongated structure that has a first end 212 and an opposing second end 214, with the first end 212 being a free end that can be gripped and manipulated by the user so as to cause the piston 210 to move axially within the holding chamber 202. A handle 213 can be provided at the first end 212 to make it easier for the user to grasp and manipulate and axially move the piston 210 in the holding chamber 202.

At the second end 214, the piston/plunger 210 includes a stopper 216 that contacts and forms a seal with the inner wall of the holding chamber 202, while at the same time permitting the piston 210 to freely slide within the holding chamber 202. According to the illustrated embodiment, the stopper 216 is a disk like structure or seal member formed of a suitable material, such as an elastomer that seals against the inner wall of the holding chamber 202. The stopper 216 thus partitions the holding chamber 202 into two compartments when the stopper 216 is located between the ends of the holding chamber 202, with the volume of the spaces being variable depending upon where the stopper 216 is located.

The first conduit 220 is in fluid communication with the holding chamber 202 so that fluid from the source 112 is delivered through an inlet opening or port 207 into the interior of the holding chamber 202 where the fluid is received and stored. The shape of the holding chamber 202 needs to be complementary to the shape of the stopper 216 to permit the stopper 216 to seal against the inner surface thereof. The holding chamber 202 is constructed so that the volume thereof is sufficient so that when the held fluid is discharged from the holding chamber 202 as described below, sufficient discharge pressure is created to force a significant and preferably a substantial volume of the fluid through both the first and second filtration stages 120, 130 and then out through the outlet port 198.

The inlet port 207 can be a connector stem or the like that defines an entrance into the interior compartment (holding chamber) 202. The first conduit 220 can thus be sealingly mated to the inlet port 207 such that the fluid from the source 112 is directly delivered into the holding chamber 202. However, the inlet port 207 can be in any number of other forms so long as the first conduit 220 can sealingly mate thereto.

The holding chamber 202 also has an outlet port 209 that is in fluid communication with the first header space 172 so as to permit the fluid discharged from the holding chamber 202 under operation of the pump mechanism 200 to be delivered into the first filtration stage 120. The outlet port 209 can take any number of different forms, including a connector stem or the like to permit a second conduit 222 to be fluidly connected between the outlet port 209 and the inlet port 182 associated with the first header space 172. This second conduit 222 is thus a bridging conduit that fluidly connects the interior holding chamber 202 to the first header space 172. The second conduit 222 can be similar to the first conduit 220 and therefore, it can take the form of a piece of tubing or the like that can carry the raw fluid from the holding chamber 202 to the first header space 172. Preferably, the connections between the inlet port 207 and the first conduit 220 and the outlet port 209 and the second conduit 222 provide a sealed interface between the two elements. It will be appreciated that the first conduit 220 serves as inlet conduit to deliver the raw fluid to the holding chamber 202, while the second conduit 222 serves as an outlet conduit to deliver raw fluid from the holding chamber 202 to the filtration component and more specifically, the first header space 172.

A first one way check valve 230 is disposed within and along the first conduit 220 to control the flow of fluid through the first conduit 220 and a second one way check valve 232 is disposed within and along the second conduit 220 to control the flow of fluid through the second conduit 220. As is well known, one way check valves function to permit fluid to flow only in one direction and in the case of the first check valve 230, the valve 230 operates to permit fluid to only flow in a direction from the water source 112 to the holding chamber 202 and thus, when the plunger (piston) 210 is moved in a direction toward the first end 114 of the housing 110 to discharge the stored fluid, the fluid is prevented from flowing back down the first conduit 220 to the fluid source 112. Similarly, the second check valve 232 operates to permit fluid to flow only in a direction from the holding chamber 202 to the first header space 172 and thus, when the plunger 210 is moved in the direction toward the first end 114, the fluid discharged from the holding chamber 202 flows only in a direction from the holding chamber 202 toward the first header space 172. Similarly, when the plunger 210 is moved in a direction toward the second end 116 to draw fluid into the holding chamber 202, the second check valve 232 operates to prevent fluid from flowing back down the second conduit 222 and into the holding chamber 202.

The dual stage ultrafilter apparatus 100 is constructed to be a compact, portable device that provides redundant fluid filtration in remote locations or locations where filtered fluid is otherwise not available. To operate the apparatus 100 and produce a quantity of filtered fluid, the distal end of the first conduit 220 is placed in fluid communication with the raw fluid source 112 that is to be treated. The pump mechanism 200 is then operated so as to draw the raw fluid through the first conduit 220 into the holding chamber 202 as the user continuously moves the plunger 210 within the holding chamber 202 in a direction toward the second end 116 of the housing 110. As the user continuously moves the plunger 210 in this direction, the available volume for storing the fluid increases.

Once the user has drawn in a sufficient volume of fluid into the holding chamber 202 or the plunger 210 has reached the end of its travel, the user then introduces the raw fluid into the first filtration stage 120 and then ultimately, the second filtration stage 130 by moving the plunger 210 in the opposite direction, namely, in a direction toward the first end 114 of the housing 110. The stopper 216 thus forces the stored fluid to be expelled or discharged from the holding chamber 202 and since the first check valve 230 prevents discharge of the stored fluid into the first conduit 220, the fluid is forced through the outlet port 209 and into the second conduit 232 where it flows through the inlet port or opening 182 and into the first header space 172. As a result of the presence of the inner wall (separator) 188 of the discharge conduit 196, the raw fluid discharged into the first header space 172 can not flow into the open ends of the second bundle of fibers 131 but instead, the fluid flows into the insides (inner lumen) of the first bundle of fibers 121. The fluid is then filtered as described above in that the fluid within the inner lumens of the fibers 140 in the first filtration stage 120 flows across the fiber membrane of each fiber, which effectively removed bacteria, endotoxins, other undesired matter, etc., from the raw fluid. All of the fluid is forced across the fiber membranes since the opposite ends of the hollow fibers 140 have been sealed off by the second potting compound 181. The fluid then flowing within the filtration compartment or space is conducted across the fiber membranes associated with the second filtration stage 130 due to existing pressure differentials and into the inner fiber lumen of the second bundle of fibers 131 and is thus filtered a second time. As such, the second fiber bundle 131 makes up the redundant filtration stage.

The twice filtered fluid then exits into the second header space 174 and out of the outlet port 198 where it can be processed in a desired manner, e.g., it can be directed into a storage container.

Several other optional features can be included as part of the design of the apparatus 100. In particular, a lock mechanism 240 can be provided for securely receiving and locking the pump handle 213. In the illustrated embodiment, the lock mechanism 240 is in the form of a catch that frictionally receives and securely grasps the handle 213 of the piston 210 so as to prevent the piston 210 from inadvertently moving axially within the holding chamber 202. The catch 240 also functions to restrict the rotation of the handle 213 so as to prevent the plunger 210 from inadvertently rotating around as during transportation and/or storage.

In addition, the apparatus 100 can have a winder mechanism 250 that serves to wind and unwind the first conduit 220 that is placed in communication with the fluid source 112. The winder mechanism 250 can take any number of different forms, including those that are typically used in the hose reel field. For example, the winder mechanism 250 of FIGS. 1-4 generally includes a rotatable housing or body 252 that is disposed at the first end 114 of the housing 110 and according to one embodiment, the housing 252 is rotatable relative to both the adjacent header space 170 and the discharge conduit 196. In fact, the discharge conduit 196 extends through the housing 252 and protrudes therefrom since it is in the form of an outlet spout.

It will be appreciated that the housing 252 defines a dry compartment 254 where the first conduit 220 can be wound into when the apparatus 100 is not in use and then unwound therefrom when the apparatus 100 is in use. The first conduit 220 in fact can be partitioned into several segments depending on and in order to accommodate the operation of the winder mechanism 250. More specifically, a first segment of the first conduit 220 passes through a first opening 259 formed in the housing 252 and terminates with an end of the first conduit 220 that is placed into the fluid source 112. This end of the first conduit 220 can include a floatation element (a float) 231 that causes this particular section of the first conduit 220 to float. The end of the first conduit 220 can also include a screen or mesh 233 that serves to initially filter out any large matter from the fluid source 112. The other second segment of the first conduit 220 is in fluid communication with the first segment and is fluidly attached at one end to the inlet port 207 that leads into the holding chamber 202. Since the second segment is attached to the holding chamber 202 (pump mechanism 200), which is stationary, the winder mechanism 250 is designed to operate by having the second segment be substantially fixed and not rotate with the housing 252 and the first segment of the first conduit 220 be cable of winding around the discharge conduit 196.

Figure 2:
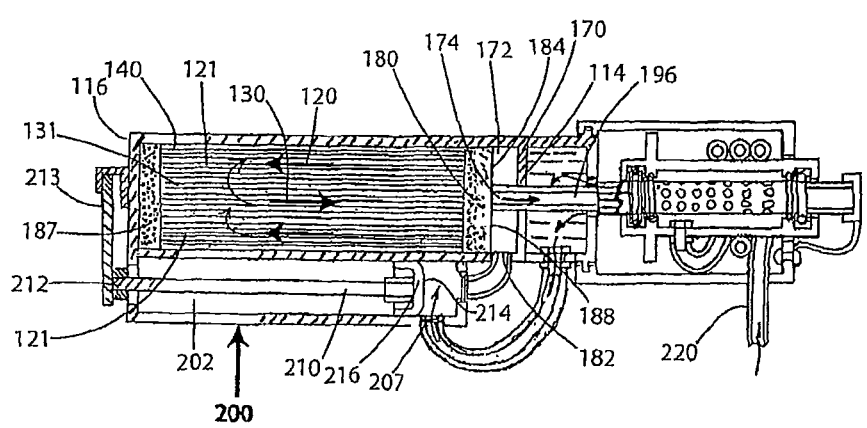
FIG. 2 is a cross-sectional view taken along the line 2-2 of FIG. 1.
Figure 2A:
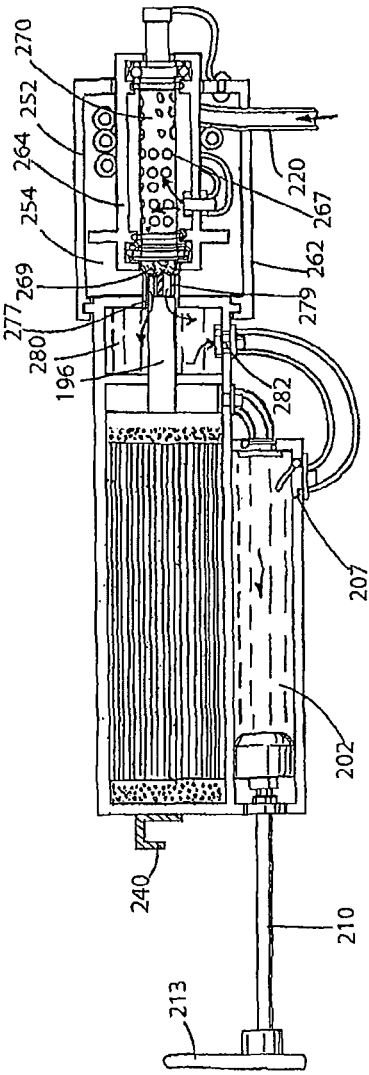
FIG. 2A is a cross-sectional view taken along the line 2-2 of FIG. 1 illustrating the pump mechanism in a first position to draw fluid into the apparatus.
Figure 2B:
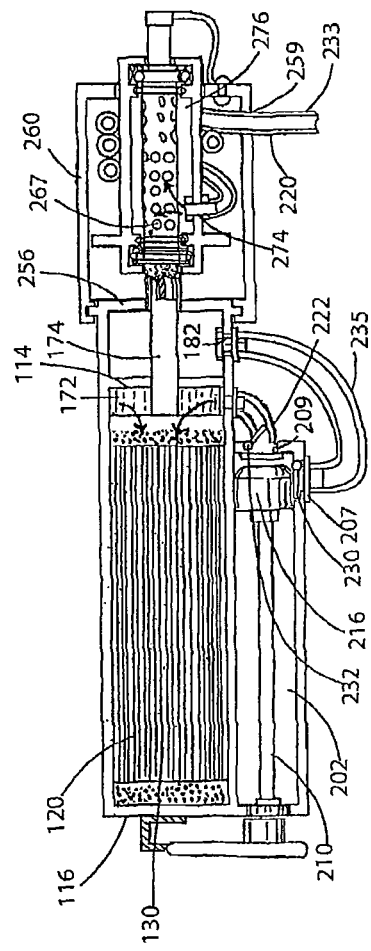
FIG. 2B is a cross-sectional view taken along the line 2-2 of FIG. 1 illustrating the pump mechanism in a second position to discharge fluid stored in the apparatus.
Figure 3:
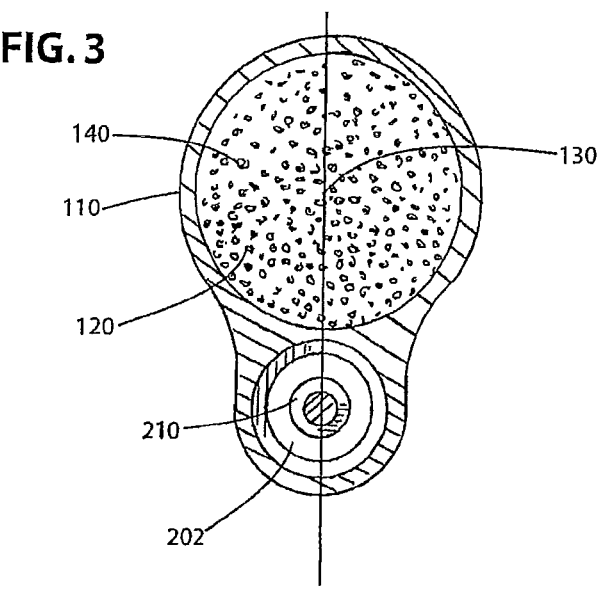
FIG. 3 is a cross-sectional view taken along the line 3-3 of FIG. 1.
Figure 4:
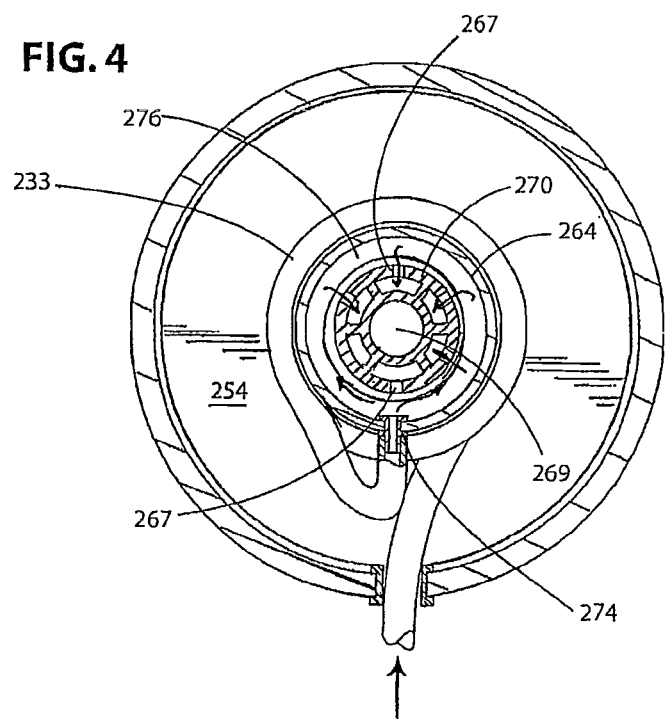
FIG. 4 is a cross-sectional view taken along the line 4-4 of FIG. 1.

FIGS. 2-4 illustrate, in greater detail, a winder mechanism 250 according to one exemplary embodiment. The housing 252 of the winder mechanism 250 includes a first part 256 that is fixedly attached to the first end 114 of the housing 110 of the filtration component. The first part 256 is not rotatably mounted to the housing 110 but a second part 260 of the housing 252 is rotatably mounted to the first part 256 yet fluidly communicated thereto in a sealed manner such that when the second part 260 is rotated relative to the first part 256 as described below, fluid can be transferred from the second part 260 to the first part 256 in a sealed manner.

The second part 260 is defined by an outer casing 262 that defines the dry compartment 254. The second part 260 includes a first core member 264 that is disposed within the outer casing 262, as well as a second core member 270 that is also disposed within the outer casing 262. In the illustrated embodiment, the discharge conduit 196 and the first and second core members 264, 270 are all concentric with one another, with the second core member 270 being the radially innermost member and the outer casing 262 being the radially outermost member. While the shapes of the first and second core members 264, 270 can take any number of different forms, the illustrated embodiment shows the members 264, 270 having cylindrical shapes.

The second core member 270 is fixedly attached to the outer casing 262 so that rotation of the outer casing 262 results in the simultaneous rotation of the two members, while the first core member 264 is stationary relative to these two members since the first core member 264 is fitted on the discharge conduit 196. Near one end of the first core member 264 is an opening 274 that forms an entrance into an interior compartment 276. Within the interior compartment 276 lies the first core member 264 and the discharge conduit 196; however, there is an annular space that is formed between the first core member 264 and the inner surface of the second core member 270.

As previously mentioned, the first conduit 220 is partitioned into a first segment 233 and a second segment 235, with the first segment 233 being fluidly connected to the second part 260 and having the distal end which is to be placed in the fluid source 112. The second segment 235 is in fluid communication between the first part 256 and the inlet port 207 that is associated with the holding chamber 202. One end 235 of the first segment 233 is fluidly attached to the opening 274 so that fluid flowing within the first segment 233 flows into the interior compartment 276 in a sealed manner. The opening 259 is formed in the outer casing 262 such that the first segment 233 passes through the opening 259 and wraps around the first core member 264 before terminating at the opening 274.

The second core member 270 is a perforated hollow member (foraminous cylinder) such that fluid can pass through the plurality of openings 267 formed in the cylindrical wall thereof and into an interior compartment 269 thereof. Thus, after the fluid flows into the interior compartment 276, the fluid flows through the openings 267 and into the interior compartment 269. One end of the first core member 264 is in fluid communication with the first part 256 to permit the fluid flowing within the interior compartment 269 to flow directly into an intermediate fluid holding cavity or compartment 280 that is defined by a body structure of the first part 256. As illustrated, the compartment 280 is an annular compartment that is formed around the discharge conduit 196. In the illustrated embodiment, one end 277 of the second core member 270 has a plurality of openings or ports 279 that are located within the compartment 280 and the opposite end of the second core member 270 is sealed so that the fluid must flow through the openings 279 and into the compartment 280 as more fluid is pumped into the interior compartment 276, 269.

The intermediate compartment 280 has an outlet port or opening 282 formed in an outer wall thereof. One end of the second segment 235 is fluidly and sealingly attached to the outlet port 282, with an opposite end of the second segment 235 being fluidly and sealingly attached to the inlet port 207 that is associated with the holding chamber 202. Thus, fluid flowing into the compartment 280 flows directly into the second segment 235 to the holding chamber 202.

It will be appreciated that the user can wind the first segment 233 of the first conduit 220 into the dry compartment 254 defined by the outer casing 262 by simply rotating the outer casing 262 relative to the remaining parts of the apparatus 100 without disrupting the flow of the raw fluid into the first filtration stage 120.

Now referring to FIGS. 5-10 in which a dual stage ultrafilter apparatus 300 according to another embodiment is illustrated. The apparatus 300 is similar to the apparatus 100 and therefore, identical elements are numbered alike and are not discussed in any detail since they have previously been discussed in detail with reference to the first embodiment.

The main difference between apparatus 300 and apparatus is the pump mechanism that serves to move the raw, unfiltered fluid through the first and second filtration stages 120, 130 to produce a twice filtered fluid. Instead of having the piston pump mechanism 200 shown in FIG. 1, the apparatus 300 has a pump mechanism 310 that is still a hand operated system similar to the mechanism 200.

The pump mechanism 310 is of a bellows type construction and is located at the second end 116 of the housing 110. The bellows construction of the pump mechanism 310 permit the user to draw fluid from the source 112 and store it in a temporary holding location by expanding the bellows and then conversely, the user discharges the held fluid by simply retracting the bellows back to the closed position.

One exemplary pump mechanism 310 includes a cap 320 that is intended to be grasped and manipulated by the user to open and close a bellows structure 330. The cap 320 can take any number of different shapes including a generally circular shape as illustrated. The cap 320 is formed of a body 322 that define an internal cavity 324. The size of the internal cavity 324 of the cap 320 should be sufficient so that the bellows structure 330 can be stored therein when the cap 320 is in the closed, locked position.

The bellows structure (bellows) 330 in it simplest terms is a structure that is deformable in such a way as to alter its volume for delivering a fluid in a controlled quantity to a controlled location. The bellows 330 has a first end 332 and an opposing second end 334, with the first end 332 being attached to an inner wall of the housing 110 at the second end 116. The second end 334 of the bellows 330 has a reinforced ring structure 336 or the like to aid in attaching the second end 334 to the cap 320. For example, an inner end wall of the cap 320 can include one or more tabs or recesses 338 that engage and/or receive the ring structure 336 so as to securely yet rotatably attach the ring structure 336 to the cap 320. More specifically, the cap 320 is permitted to rotate relative to the stationary bellows 330 due to the design of the ring structure 336 and the retaining tabs 338.

While the first end 332 of the bellows 330 is an open end, the second end 334 is a closed end such that the bellows 330 includes a cavity or storage or holding compartment 340 that receives and stores the raw, unfiltered fluid as described below. Due to the deformable nature of the bellows structure 330, the volume of the holding compartment 340 is variable in that when the bellows 330 is fully opened, the volume is at its greatest and when the bellows 330 is fully closed, the volume is at its least.

The bellows structure 330 serves a number of functions including that the operation thereof creates the necessary pressure differential that causes the fluid to first flow into the first conduit 220 and then into the holding chamber associated with the bellows 330, as well as providing a sealed holding chamber that holds the raw, unfiltered fluid before it is discharged into the first header cap 172.

Preferably, the pump mechanism 310 is of the type that can be securely fixed to the housing 110 of the apparatus 300 when it is not in use as when it is being stored and/or transported. The means for securely fixing the pump mechanism 310 can take any number of different forms, such as a snap fit arrangement, a friction fit or other mechanism fit, or by spaced magnets that cause the pump mechanism 310 to remain in the closed position. In the illustrated embodiment, the pump mechanism 310 is held in place by means of complementary threads formed on both the cap 320 of the pumping mechanism and the housing 110. More specifically, the cap 320 includes internal threads 321, while the second end 116 of the housing 110 includes complementary external threads 117 that permit the cap 320 to be threadingly secured to the housing 110 resulting in the bellow 330 being held in the closed, retracted position.

The pump mechanism 310 includes an inlet conduit which in this case includes the second segment 235 of the first conduit 220 which serves to bring the raw, unfiltered fluid into the holding/storage compartment 340 of the bellows structure 330. More specifically and according to this embodiment, the second segment 235 extends from the fluid holding cavity or compartment 280 that is defined by the first part 256 to an inlet port 342 of the bellows storage compartment 340. Thus, the first and second segments 233, 235 of the first conduit 220 serve to deliver the raw, unfiltered fluid to the compartment 340 where it is stored momentarily before being delivered to the first filtration stage. The location of the second segment 235 is not critical; however, for the sake of compactness and ease of use, the second segment 235 typically is either contained within the housing 110 itself or is attached to and runs along an outer wall of the housing 110. In the illustrated embodiment, the second segment 235 is shown as being contained within the housing 110 such that the hollow filtration fibers 140 surround the second segment 235. In other words, the second segment 235 is a tubular structure that is mixed in with the hollow fibers 140 within the housing 110. In order to reduce any impact of the second segment 235 on the hollow fibers 140, the second segment 235 can be disposed immediately adjacent and in contact with an inner wall of the housing 110. It will be appreciated that when the second segment 235 is disposed within the interior of the housing 110, the second segment 235 passes through the first and second potting compounds 180, 181, which serve to fixedly locate and hold the second segment 235 in place.

The pump mechanism 310 further includes an outlet conduit 350 which serves to deliver the raw, unfiltered fluid that is temporarily stored in the compartment 340 to the first filtration stage 120. The outlet conduit 350 is similar to the other fluid carrying conduits in that it is an elongated hollow structure that extends from an outlet port 344 of the compartment 340 to the first header space 172 where the fluid can flow into the fiber bundle 121 of the first filtration stage 120. Similar to the inlet conduit, the location of the outlet conduit 350 is not critical; however, for the sake of compactness and ease of use, the outlet conduit 350 typically is either contained within the housing 110 itself or is attached to and runs along an outer wall of the housing 110. In the illustrated embodiment, the outlet conduit 350 is shown as being contained within the housing 110 such that the hollow filtration fibers 140 at least partially surround the outlet conduit 350.

Similar to the first embodiment, the pump mechanism 310 includes the first and second one way check valves 230, 232. The first one way check valve 230 can be disposed at or near the inlet opening 342 of the compartment 340 (either in the second segment 335 itself or in the inlet opening 342 itself) and is designed to let fluid only pass into the interior compartment 340 and not exit therefrom back into the conduit 235 or as illustrated at or near the compartment 280 as shown in FIG. 8. The second one way check valve 232 can be disposed at or near the outlet opening 344 of the compartment 340 (either in the conduit itself or in the opening itself) and is designed to let fluid only pass from interior compartment 340 into the outlet conduit 350. In the illustrated embodiment, the valve 232 is disposed at or near the compartment 280 as illustrated in FIG. 7. Thus, when the bellows structure 330 is operated by pulling the cap 320 and the attached bellows 330 away from the second end of the housing 110, the bellows 330 begins to expand and create a negative pressure in the first conduit 220 (first and second segments 233, 235) so as to draw the fluid from the source 112 through the first conduit 220 and into the interior compartment 340 of the bellows 330 and is stored therein since the first check valve 230 is open, while the second check valve 232 is closed.

Once the user has drawn a desired volume of fluid into the interior compartment 340 or the compartment 340 is full, the user then reverses the direction of force being applied to the cap 320 and bellows 330 and pushes both back towards the second end of the housing 110. This reversal in applied pressure causes the first check valve 230 to close, while the second check valve 232 opens and the fluid stored in the compartment 340 is then discharged into the outlet conduit 350 where it flows toward and into the first header space 172 and then the fiber bundle 121 and ultimately the fiber bundle 131 so as to twice filter the fluid. The filtration operation of the apparatus 300 is the same as the apparatus 100 and therefore is not further discussed in any detail.

Now referring to FIGS. 11-14 in which a dual stage ultrafilter apparatus 400 according to yet another embodiment is illustrated. The apparatus 400 is similar to the apparatus 300, as well as the apparatus 100, with the exception that instead of being a hand held bellows type pump, the apparatus 400 is in the form of a detachable foot operated diaphragm (bellows) pump mechanism 410. In this embodiment, the pump mechanism 410 includes the detachable foot operated diaphragm pump 420 that includes a first part 422 is intended to be placed on a solid surface, such as the ground; a second part 424; and a diaphragm (bellows) member 430 that is attached between the first and second parts 422, 424. As with the bellows 330, the diaphragm 430 is an expandable/deformable member whose internal volume is variable so as to generate pressure differentials within the conduit system. The diaphragm 430 is sealingly attached to the first and second parts 422, 424 since an internal cavity or compartment 432 thereof must be capable of storing the raw, unfiltered fluid.

In one embodiment, the first and second parts 422, 424 are spring loaded so that in a rest position, the second part 424 is biased from the first part 422 in an open position resulting in the diaphragm 430 being fully expanded when the second part 424 is released from the first part 422. The first and second parts 422, 424 preferably include a locking feature to permit the two parts to be selectively locked together. For example, the first part 422 includes a first locking feature 423 and the second part 424 includes a second locking feature 425 that permits the two parts 422, 424 to be locked together to permit compact storage of the apparatus 400. The first and second locking features 423, 425 can take any number of different structures, including a snap-fit, locking tabs, hook and loop, or a frictional mechanical fit as shown, etc.

The second segment 235 is fluidly and sealingly connected to the compartment 432 to permit the raw, unfiltered fluid to be delivered into the compartment 432 from the fluid source 112. Similar to the apparatus 300, a length of the second segment 235 runs within the housing 110 but in this embodiment, a significant length of the second segment 235 extends beyond the second end of the housing 110 to permit the pump mechanism 410 to be placed on the ground.

Since the pump mechanism 410 is typically placed on the ground further away from the housing 110, the second segment 235 and the outlet conduit 350 are of greater length than in the previous hand held embodiment in order to permit the pump mechanism 410 to be located at a remote location compared to the housing 110. The second segment 235 and the outlet conduit 350 perform the same function as in the previous embodiment in that they route the raw, unfiltered fluid to the compartment 432 and then to the first header space 172.

In one embodiment, the first part 422 can have a conduit storage area incorporated therein to store the lengths of the second segment 235 and the outlet conduit 350 that extend from the second end of the housing 110 to the pump mechanism 410. More particularly, an underside of the first part 422 that faces and is disposed adjacent the second end of the housing 110 can include a hollow space that acts as the storage area. A retaining feature, such as a plurality of retaining tabs or the like, can be included as part of the underside of the first part 422 so that once the conduits 235, 350 are wound into the storage area, the conduits 235, 350 are securely held therein. This permits the conduits (tubing) to be stored such that the first part 422 can be securely attached to the housing 110 by means of internal threads 440 that are formed as part of the first part 422 and complementary external threads 422 formed as part of the housing 110.

Accordingly, when the first and second parts 422, 424 are securely fixed to one another and the first part 422 is threadingly fastened to the second end of the housing 110, the pump mechanism 410 is securely attached to the housing 110 for transport and storage of the apparatus 400.

Alternatively and as shown in FIGS. 12-14, a conduit storage area 429 can be provided as part of the housing 110 and in particular, the housing 110 is extended beyond the second potting compound 181 so as to form an interior cavity (the conduit storage area 429) that is defined an annular side wall 441 and an end wall 443 that has openings formed therein to permit communication with the inlet and outlet conduits 235, 350.

The storage area 429 is constructed to permit the pump mechanism 410 to be securely attached to the housing 110 without an excessive length of conduits being present. In order to accomplish this, a pair of connector conduits 235', 350' can be supplied and attached at first ends to complementary connectors that are part of the conduits 235, 350, respectively. Opposite second ends of the connector conduits 235', 350' can be attached to connectors 463, 461, respectively, so as to fluidly connect the conduits 235, 350 with the internal storage compartment 432 of the bellows 430. When complete storage of the apparatus is required, the connector conduits 235', 350' can be detached from the connectors 463, 461 and the conduits 235, 350 and neatly stored in the area 429 as the body 422 is threadingly fastened to the housing 110. FIG. 14 shows the connector conduits 235', 350' in the detached states.

As with the other embodiments, first and second one way check valves 230, 232 are provided and are disposed within the second segment 235 and the outlet conduit 350. The valves 230, 232 work in the same manner as previously described with reference to apparatus 300.

To operate the apparatus 400, the pump mechanism 410 is detached from the housing 110 and the first and second parts 422, 424 are placed on the ground. Next, the first and second parts 422, 424 are detached from one another and the spring loaded design causes the second part 424 to be biased outward from the first part 422, thereby expanding the diaphragm 430. This results in raw fluid being drawn into the compartment 432. To discharge the raw fluid that is stored in the compartment 432, the user places his/her foot on the second part 424 and then exerts pressure against the second part 424 in a direction toward the first part 422, thereby retracting/compressing the diaphragm 430 to a closed position. As the diaphragm 430 is compressed, the fluid stored therein is discharged into the outlet conduit 350 and flows therein to the first header space 172 where it flows into the fiber bundle 121 of the first filtration stage 120.

Figure 11:
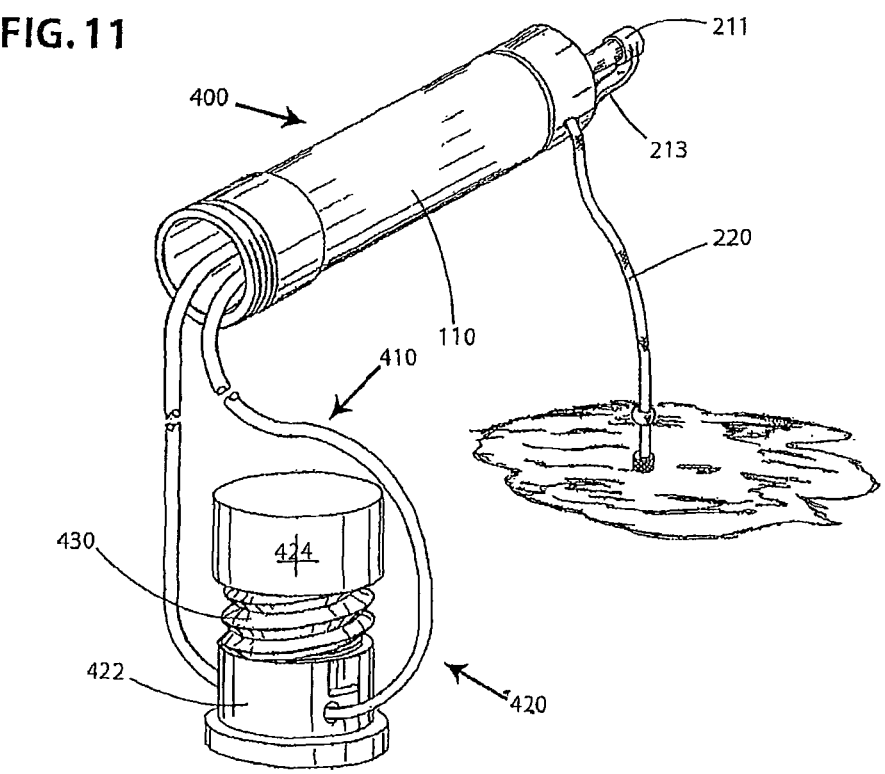
FIG. 11 is a perspective view of a dual stage ultrafilter apparatus according to a third embodiment.

As shown in FIG. 11, the distal end of the discharge conduit 196 can include a removable cover or cap 211 that is attached to the outside wall of the discharge conduit 196 by means of a flexible connector strap 213.

FIG. 15 illustrates a dual stage ultrafilter apparatus 500 according to another exemplary embodiment. The apparatus 500 is similar to the apparatus 300 and therefore, only the differences between the two apparatuses are described in detail. The apparatus 500 is based on a hand operated bellow/diaphragm type pump mechanism; however, unlike the previous embodiment, the apparatus 500 includes a lever pump mechanism 510. The expandable/retractable diaphragm (bellows) 330 is attached to the second end of the housing 110 and attaches to the cap 320 which is rotatably mounted to the diaphragm 330.

In this embodiment, the outer wall of the housing 110 includes a pair of guide features, namely a first guide feature and a second guide feature preferably on opposite sides of the housing 110, each of which includes a guide track 520 formed along a length of the outer wall of the housing 110 and a guide rod 522. The guide rod 522 is an elongated member that is attached at one end to the cap 320, with the other end of the guide rod 522 being received within a guide slot formed in the guide track 520.

The pump mechanism 510 also includes a lever mechanism 530 that is hand operated and includes a lever 540 that is securely attached to the cap 320 via connector (e.g., an arm or finger) such that movement of the lever 540 is translated into axially movement of the bellows 330 along the longitudinal axis of the housing 110. The attachment between the lever 540 and the cap 320 can be accomplished in any number of different ways, including a pin or a snap fit arrangement, both of which permit the lever 540 to be detached from the cap 320.

One end of the lever 540 is adapted to be gripped and manipulated by the user, while the lever 540 is pivotally attached to the housing 110 using a pivot construction, generally indicated at 550. Exemplary lever pump mechanisms 510 of this type are commercially available from Cole-Parmer, e.g., Guzzler® diaphragm hand pump. The pivot connection permits the pivoting of the lever 540 to be translated into the above described axial movement of the bellows 330.

To operate the pump mechanism 510, the user simply moves the lever 540 in a direction indicated by arrow 529 out of the retracted bellows position (shown in FIG. 15) and the pivoting motion of the lever 540 is translated into axial movement of the cap 320 in a direction away from the second end of the housing 110, thereby causing the bellows 330 to expand and the fluid to be drawn into the bellows 330. The travel of the guide rods 526 in the guide tracks 524 permits the controlled movement of the cap 320 and the bellows 330.

To compress the bellows 330, the lever 540 is simply pivoted in an opposite direction indicated by arrow 531, thereby causing the cap 320 to move back towards the second end of the housing 110. This results in the bellows 330 closing and the fluid stored in the compartment 340 being discharged into the outlet conduit 350 and delivered to the first header space 172.

The lever based pump mechanism 510 permits the user to rapidly pump the fluid from the source 112 into the bellows (diaphragm) compartment 340 and then into the first header space 172 and then the first and second stages 120, 130 before being discharged through the conduit 196 by repeatedly lifting and closing the lever 540.

Preferably, the lever 540 can be completely and easily detached from the housing 110 as by detaching it from the pivot connection 550 (e.g., as by removing a pivot pin) and then detaching it from the cap 320 and then securely storing the lever 540 along the housing 110 as by releasably placing the lever 540 in a clamp 533.

Figure 16:
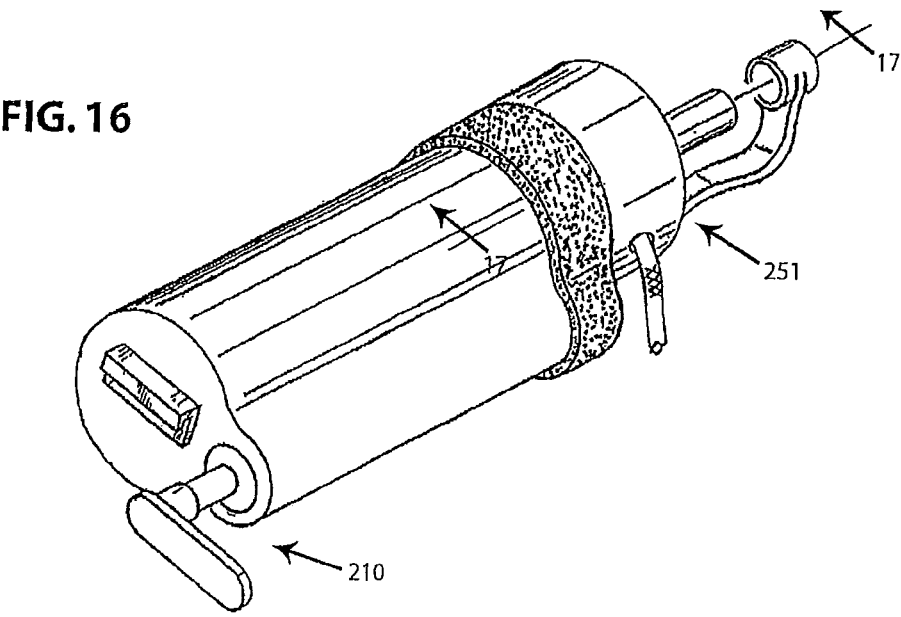
FIG. 16 is a perspective view of a dual stage ultrafilter apparatus according to a fifth embodiment.
Figure 17:
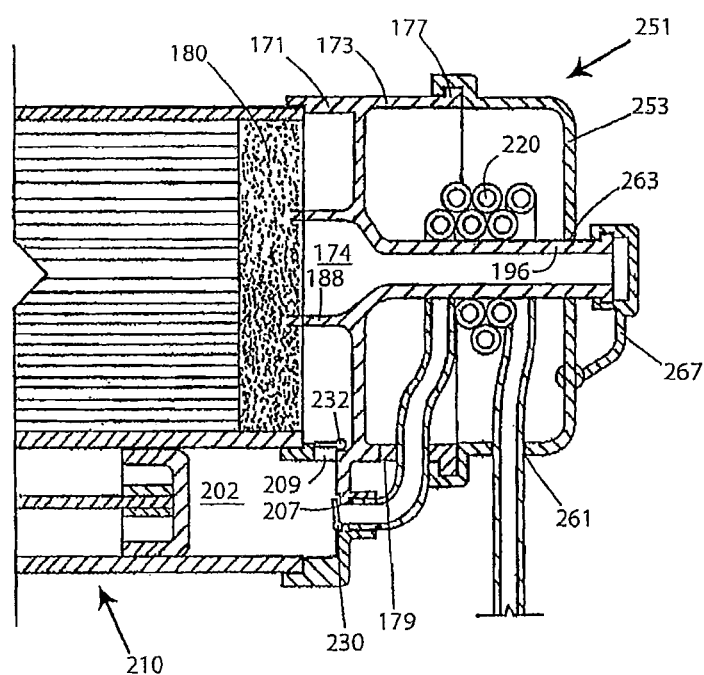
FIG. 17 is a cross-sectional view taken along the line 16-16 of FIG. 16 illustrating a winder mechanism according to another embodiment.

FIGS. 16-17 illustrate the apparatus 100 with a different type of winder mechanism 251. In this embodiment, the winder mechanism 251 is complementary to a header cap 171. As shown in FIG. 17, the header cap 171 includes annular inner wall 188 that partitions the header space into the first and second header spaces 172, 174. The discharge conduit 196 is an integrally part of the inner wall 188 and is in the form of an elongated tubular member that is open at both ends, with one end opening into the second header space 174. The header cap 171 is fixedly attached to the first end of the housing 110 as previously described.

In the illustrated embodiment, the header cap 171 actually is configured to seal and close off an open end of the storage compartment 202 of the pump mechanism 210. As shown in FIG. 17, the header cap 171 can be constructed to have a diameter greater than the diameter of the housing 110 so as to permit a portion of the cap to extend beyond the housing 110 for closing off the open end of the compartment 202 of the pump mechanism 210. The inlet opening 207 is incorporated into the design of the header cap 171 as well as the outlet port 209 such that when the header cap 171 is securely attached to the first end of the housing 110, both the inlet port 207 and the outlet port 209 are in fluid communication with the compartment 202. In addition, the outlet port 209 defines an entrance into the first header space 172 to permit discharge flow from the compartment 202 into the first header space 172 as previously discussed. According to this embodiment, the first and second one way check valves 230, 232 are a part of the header cap 171 and are mounted respectively next to the inlet port 207 and the outlet port 209. Once again, the header cap 171 is non-rotatably mounted to the housing 110.

The header cap 171 includes an annular rim 173 that extends beyond an end wall 175 that closes off the first and second header spaces 172, 174 at the ends thereof. However, both the discharge conduit 196 and the annular rim 173 extend beyond the end wall 175, with the discharge conduit 196 actually extending further beyond the annular rim 173. The annular rim 173 includes an annular lip 177 at its free distal end. The header cap 171 has a slot 179 formed therein proximate to the annular lip 177.

The winder mechanism 251 of this embodiment includes a winder cap member 253 that is rotatably mounted relative to the header cap 171. The cap member 253 includes a fastening portion 255 that interlockingly engages the annular lip 177 so as to securely attach the two parts together in such a way that the cap member 253 can rotate relative to the header cap 171 to permit winding of the first conduit 220 as described below. The fastening portion 255 is complementary to the lip 177 so that a mechanical fit results between the two and when this interlocking fit results, the cap member 253 is disposed over a portion of the slot 179 such that a through opening is formed. The cap member 253 also includes a through opening 261 formed in an annular side wall thereof. The through opening 261 is sized to receive the first conduit 220. A distal end opening 263 is formed in an end wall of the cap member 253 and is sized to receive the distal end of the discharge conduit 196 such that the discharge conduit 196 passes through and extends therebeyond.

In this embodiment, one end of the first conduit 220 is routed through the interior dry compartment defined by the mated cap member 253 and annular rim 173 and then through the partially covered slot 179 and to the inlet port 207 where it is securely attached thereto to permit raw fluid flowing through the first conduit 220 to pass into the storage compartment 202 and then ultimately through the outlet port 209 and into the first header space 172 where it is introduced into the first filtration stage 120. The rotatable cap member 253 thus provides a winding mechanism in that the first conduit 220 is connected to the fixed, non-rotatable inlet port 207 and passes through the slot 179 into the interior of the cap member 253 which provides a storage area for the first conduit 220. The first conduit 220 wraps around the stationary discharge conduit 196 and as the user rotates the cap member 253 relative to the fixed, stationary discharge conduit 196 and header cap 171, the first conduit 220 continuously wraps around the discharge conduit 196 and is stored in the interior of the cap member 253.

The cap member 253 can optionally have a tethered seal member 267 that is integrally attached to the end wall of the cap member 253 and includes a cap that can sealingly engage and cover the distal end of the discharge conduit 196.

Figure 18:
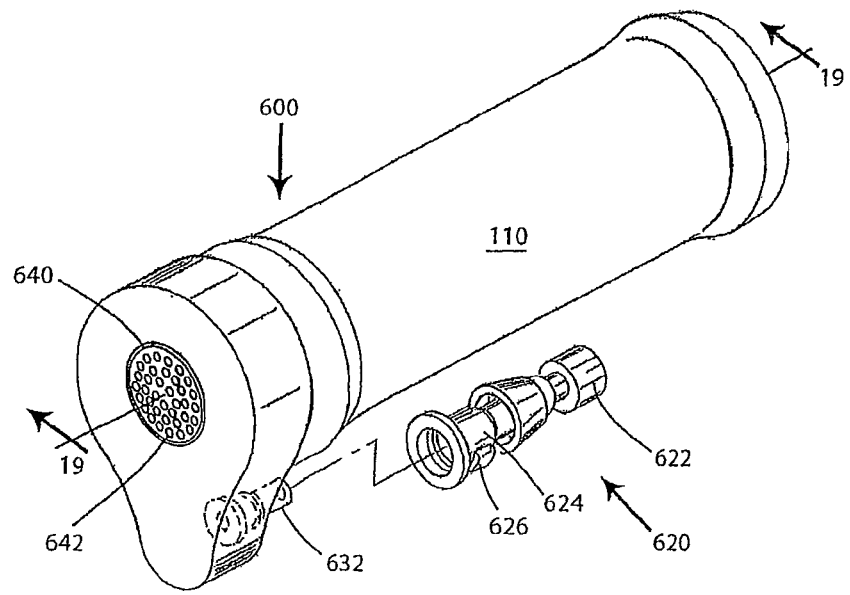
FIG. 18 is a perspective view, partially exploded, of a dual stage ultrafilter apparatus with integrated shower head according to a first embodiment in an installed position.
Figure 19:
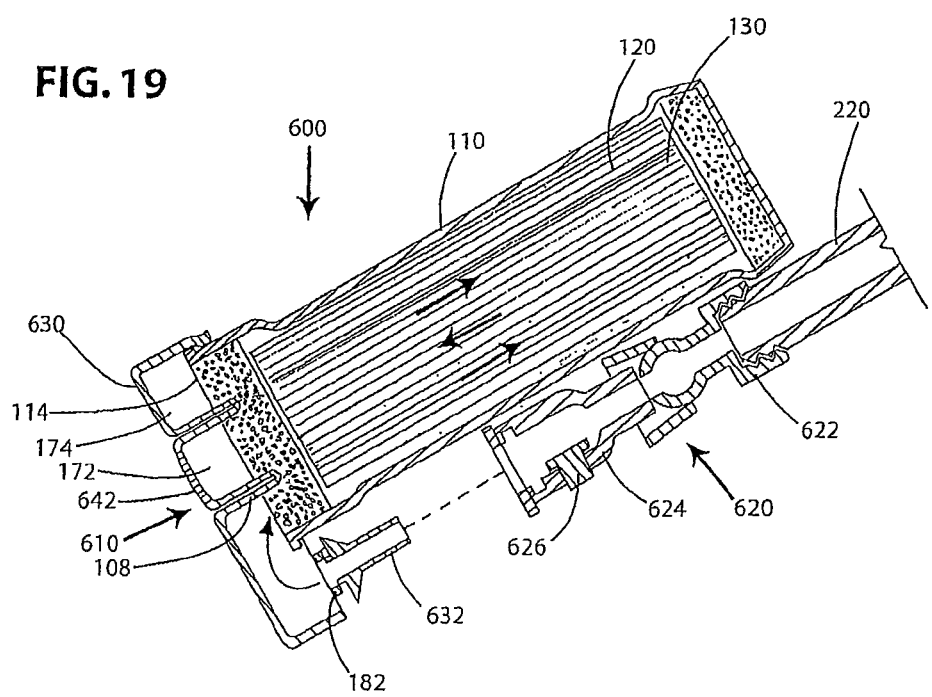
FIG. 19 is a cross-sectional view of the apparatus of FIG. 18 with the main inlet conduit being shown in an exploded position relative to the apparatus.

In yet another aspect of the present invention, a dual stage ultrafilter apparatus 600 with an integrated shower head feature 610 is illustrated in FIGS. 18-19. The apparatus 600 includes the same basic dual stage filtration housing 110 and filtration stages 120, 130 to perform redundant filtration of the fluid from source 112 prior to it being discharged through the shower head 610. The shower head feature 610 is of a fixed head version as opposed to the other head versions described below. Since the apparatus 600 shares similarities to other previously described embodiments, like components are numbered alike.

The first conduit 220 is a hose or the like that attaches at one end to an connector 620 that includes a swivel head component 622 and a quick release connector component 624 that is rotatably connected thereto. The swivel head component 622 is releasably attached to the first conduit 220 as by threadingly connecting the two members. The quick release component 624 is constructed for a quick release connection to the apparatus 600 and preferably contains a quick release button 626 for disconnecting the connector 620 from the apparatus 60Q.

In this embodiment, a header cap 630 is disposed at the first end 114 of the housing 110 and is configured to provide a shower head that discharges twice filtered (sterile) fluid. The header cap 630 is similar to the header cap 170 in that it contains the first and second header compartments 172, 174 separated by the inner wall 188. The inlet port 182 is in fluid communication with a quick release connector 632 that is complementary to and designed to be releasably and sealably connected to the quick release component 624 of the connector 620. This permits fluid flowing through the first conduit 220 to flow through the connector 620, through the inlet port 182 and into the first header space 172 (which in the illustrated embodiment is an outer annular space).

In order to provide the integrated shower feature 610, the second header space 174 is in fluid communication with a perforated shower head 640 that contains outlet orifices 642 to discharge the twice filtered fluid that flows into the second header space 174 after flowing through the second filtration stage 130 (through the fiber bundle 131 thereof).

To operate the shower apparatus 600, pressurized raw fluid is delivered through the first conduit 220 by means of an external pump mechanism that can be on-site or at a remote location as when the first conduit 220 is part of a pressurized water system. The raw fluid flows continuously through the connector 620 into the first header space 172 and the fiber bundle 121 where the raw fluid is filtered for a first time and then, as previously discussed, the once filtered fluid passes into the inner lumens of the fiber bundle 131 thereby twice filtering the fluid.

Figure 20:
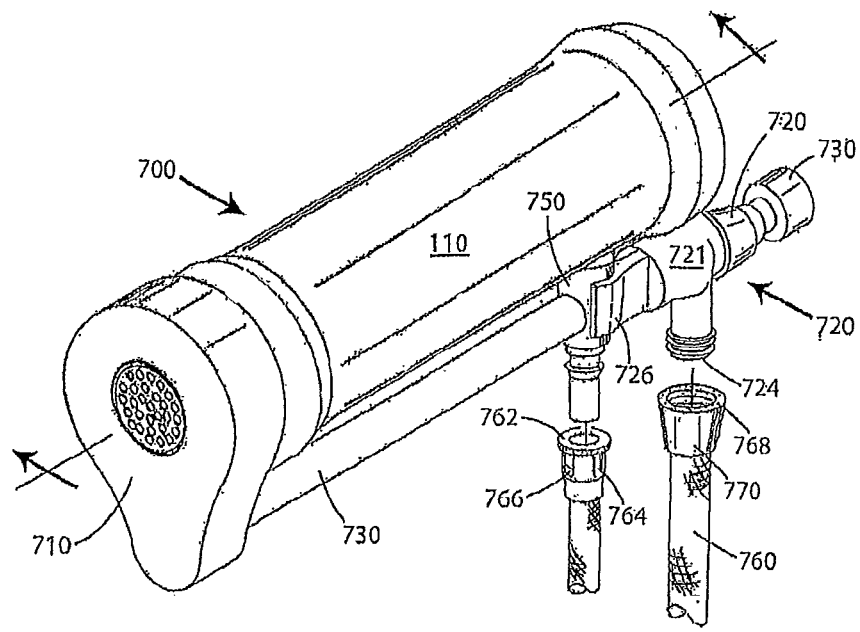
FIG. 20 is a perspective view of a dual stage ultrafilter apparatus with integrated shower head according to another embodiment and being shown exploded from a flexible conduit attachment.
Figure 21:
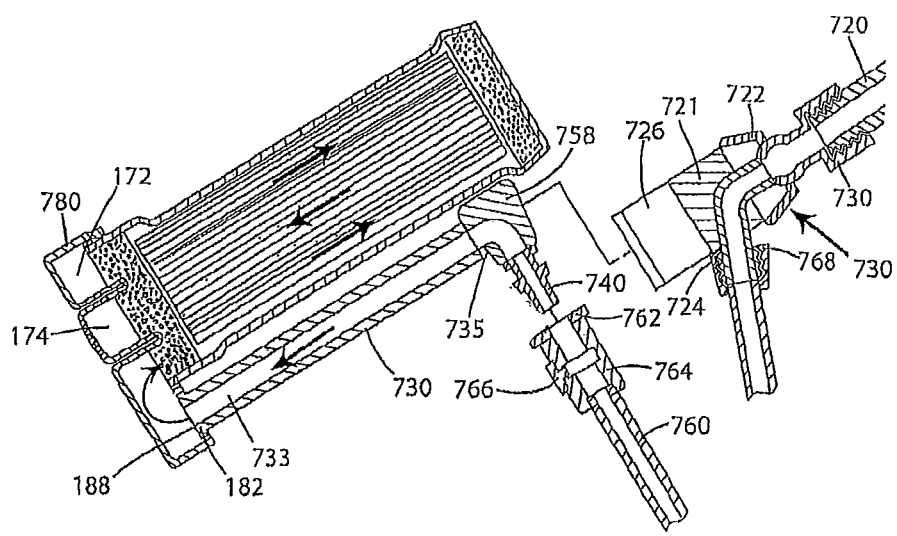
FIG. 21 is a cross-sectional view of the apparatus of FIG. 20.

Now referring to FIGS. 20-21, a dual stage ultrafilter apparatus 700 with an integrated shower head feature 710 is illustrated. The apparatus 700 is similar to the apparatus 600 with the exception that the apparatus 700 is a removable hand held version. More specifically, the first conduit 220, which is typically in the form of a hose that delivers pressurized raw, unfiltered water, is sealingly attached to a connector 720 that has a fluid passageway formed therein and beginning with an inlet 722 and terminating with an outlet 724. The distal end of the first conduit 220 is attached to a swivel head attachment adapter 730 that is fluidly connected to the inlet 722 in a swivel manner. The outlet 724 of the connector 720 includes an outlet connector which extends from the body 721 of the connector 720 and includes fastening features, e.g., external threads, that permit a member to be securely attached to the outlet connector. The connector body 721 also includes a holder bracket 726 which in the illustrated embodiment takes the form of a U-shaped clamp member.

The apparatus 700 includes a handle 730 which is constructed to permit the apparatus 700 to be easily held by the user. The handle 730 is a hollow member and includes an internal fluid passageway 732 that terminates at one end 733 at the inlet opening 182 at the first header space 172. An opposite end 735 of the handle 730 is open and includes a quick release connector portion 740 that is configured for a quick release connection. A holder member or point 750 is formed proximate the opposite end 735 and is constructed and configured to be releasably received in a frictional manner in the holder bracket 726 so as to hold the apparatus 700, and more particularly, the handle 730 thereof, relative to the connector 720. In the illustrated embodiment, the holder member 750 has a complementary shape as the bracket 726 and can be in the form of a cylindrically shaped knob or the like.

A flexible conduit (hose) attachment 760 extends between the quick release connector portion 740 associated with the handle 730 and the outlet connector 724 of the connector 720. In the case when the connector portion 740 is of a quick release type, one end 762 of the hose attachment 760 includes a complementary quick release connector 764 that mates with the connector portion 740. The connector 764 includes a release button 766 that permits the hose attachment 760 to be easily and quickly released and detached from the connector portion 740. An opposite end 768 of the hose attachment 760 has a connector or adapter 770 that sealingly mates with the outlet connector 724. For example, the connector 770 can be an internally threaded connector that threadingly mates with the external threads of the outlet connector 724. The hose attachment 760 has a sufficient length such that the apparatus 700 can be removed from its secure position in the bracket 726 as the user grips the apparatus 700 in his/her hand and then moves the housing 110 around in up and down and sideways motions to sufficiently discharge and direct twice filtered fluid onto select surfaces, e.g., body areas.

The apparatus 700 includes a header cap 780 that is similar to header cap 630 of apparatus 600 with the exception being that instead of having a connector 620, the header cap 780 includes the handle 730 in the same location. The header cap 780 includes the inner wall 188 that partitions the interior into the first and second header spaces 172, 174. The header cap 780, in this embodiment, has dimensions (diameter) that are greater than the dimensions of the first end of the housing 110 and therefore, the header cap 780 extends beyond the housing 110. In a portion of the header cap 780 that is beyond the housing 110, an open end of the handle 730 is in fluid communication with the first header space 172 to permit the raw unfiltered fluid (water) to flow through the handle 730 and into the first header space 172.

Figure 22:
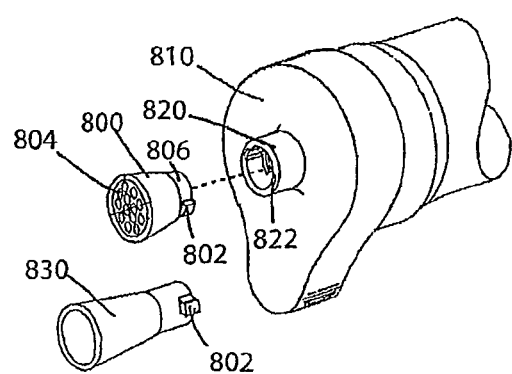
FIG. 22 is an end perspective view of a dual stage ultrafilter apparatus illustrating interchangeable nozzles.

FIG. 22 illustrate the use of changeable nozzles that are adapted to be incorporated into the designs of any of the previously described integral shower heads. In particular, FIG. 22 illustrates a first interchangeable nozzle 800 that is configured to releasably interlock with a header cap 810 that has an annular connector (boss) 820 extending therefrom. Each of the nozzle 800 and the connector 820 includes complementary interlocking features 802, 822, respectively, which permit the nozzle 800 to be securely locked to the connector 820 but yet easily removed to permit the nozzle type to be changed.

More particularly, the illustrated nozzle 800 includes a hollow body 802 that has openings 804 formed at an outlet end and a tapered connector portion 806 at the opposite end. The connector portion 804 is constructed to be received in and securely engaged to the connector 820 and in the illustrated embodiment, the interlocking features 802, 822 are of a twist lock type that permit the connector portion 806 to be received in the connector 820 and then rotated to effectuate a twist lock between the two parts. To remove the locked nozzle 800, the body 802 is rotated in the opposite direction until the features 802, 822 align again and then the nozzle 800 can be removed from the connector 820. The openings 804 are constructed and configured to produce fluid streams.

FIG. 22 also shows another nozzle 830 that is similar to the nozzle 800 with the exception that the nozzle 830 is configured to produce a cone shaped discharge of fluid instead of the streams of nozzle 800.

Figure 23:
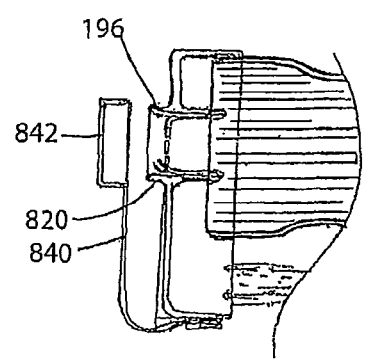
FIG. 23 is a cross-sectional view of the apparatus of FIG. 22 illustrating an optional tethered sealing cap.

FIG. 23 shows a tethered cap 840 that is attached to the header cap 810 and permits a cap 842 to be releasably attached to the open end of the connector 820 (discharge conduit 196) of the header cap.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

As discussed herein, the term "purify" generally means to remove unwanted constituents from a substance and the term "sterilize" means to make free from living microorganisms. Thus, in some applications, the two terms can be used synonymously.

FIGS. 24A, 24B and 25-27 generally show one exemplary embodiment of the present invention in which a wearable, mobile hydration apparatus 900 is provided. The hydration apparatus 900 is preferably in the form of a pack or back-pack that can easily be carried or worn over a portion of the body, as for example, across the shoulders and back of the user as in the case of a back-pack. The hydration pack 900 includes a first flexible bladder 920 and a second flexible bladder 930 that are operably coupled to a fluid transfer mechanism 940 and a water purification device 950 for producing purified water as described below.

Figure 24A:
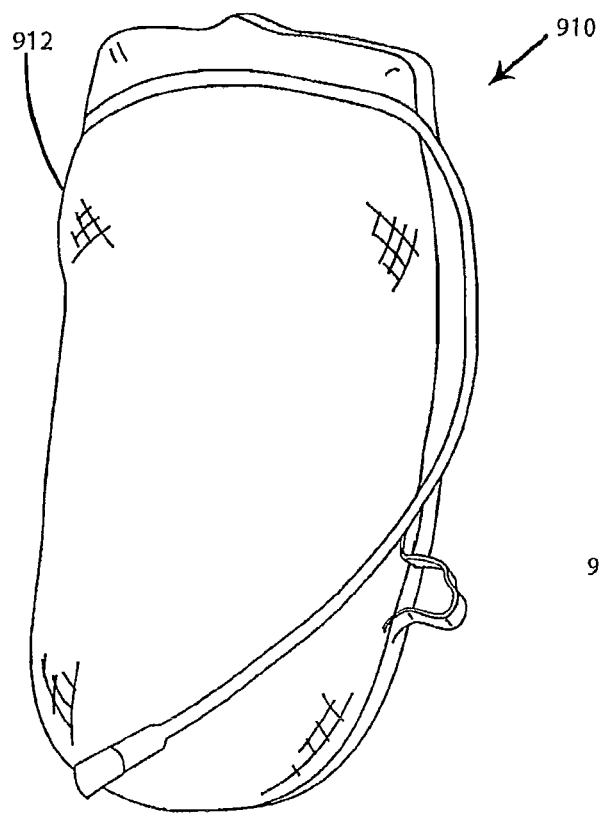
FIG. 24A is a front view of wearable, mobile hydration pack with a water purification device contained as a part thereof according to a first embodiment.
Figure 24B:
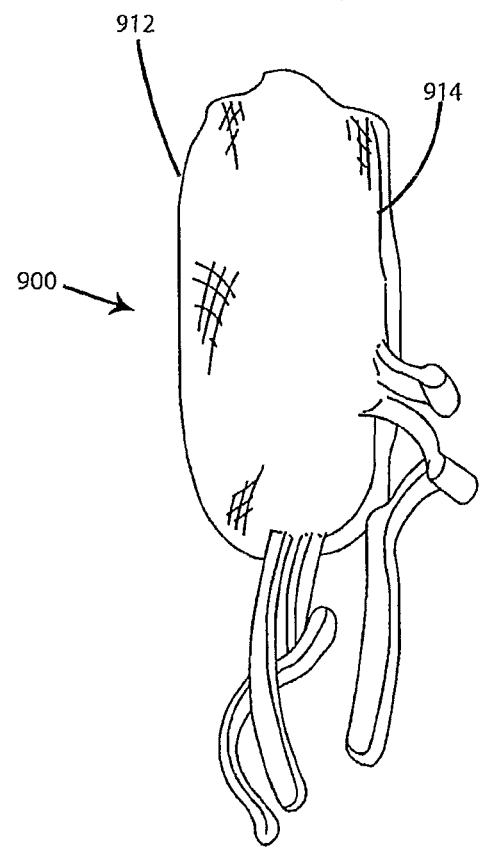
FIG. 24B is a rear perspective view of the hydration pack of FIG. 24A.

In particular, the hydration pack 900 of FIGS. 24A and 24B is in the form of a back pack that has a body 912 and two side shoulder straps 914 and is constructed to be worn in the same manner as a conventional back-pack. As best shown in the exploded view of FIG. 25, the first flexible bladder 920 is defined by an expandable/compressible body 922 and includes an inlet port 924 for filling the first bladder 920 with raw (un-purified) water that is to be purified by the water purification device 950 and ultimately delivered to the user as purified, drinking water.

Any number of different types of inlet ports 924 can be used and in the illustrated embodiment, the inlet port 924 is a threaded cap that is screwed onto a respective part of the body 922; however, the inlet port 924 can equally be a friction fit cap or plug, etc., so long as a sealed closure of the first bladder 920 can be achieved.

The first bladder 920 also has a first bladder outlet conduit 926 that is fluidly connected at one end to an outlet or port 927 of the first bladder 920 through which the raw water is discharged from the first bladder 920. The conduit 926 has another end that is operably connected and in fluid communication with the fluid transfer mechanism 940. The fluid transfer mechanism 940 is constructed so that upon operation by the user, the raw (un-purified) water stored in the first bladder 920 is drawn therefrom and routed to the water purification device 950 for purification thereof. The fluid transfer mechanism 940 is preferably in the form of a pump or the like that is manually operated by the user so as to draw the raw water from the first bladder 920 to the water purification device 950.

The illustrated pump 940 includes a body 942 that is actuatable so as create a pressure differential that causes the raw water to be drawn from the first bladder 920. The pump 940 also includes a pump inlet port 944 for receiving the raw water from the conduit 926. In other words, the other end of the conduit 926 is fluidly and sealingly connected to the pump inlet port 944. The pump 940 also includes a pump outlet conduit 946 through which the raw water passes as it is routed towards the water purification device 950. The pump outlet conduit 946 has a first end that is fluidly connected to a pump outlet port 948 that is part of the pump 940 and an opposing second end that is fluidly connected to the water purification device 950.

It will be understood that in this first embodiment, the pump 940 merely acts to draw the raw water from the first bladder 920 and then deliver it to a downstream location, which in this case is the water purification device 950 and then ultimately the second bladder 930 where the now purified water is stored. The pump 940 thus generally has a storage compartment for receiving the raw water and then some type of actuatable mechanism, like a handle or plunger or piston, that causes not only the negative pressure to draw the raw water into the storage compartment but then generates positive pressure to discharge the water to the water purification device 950.

Figure 28:
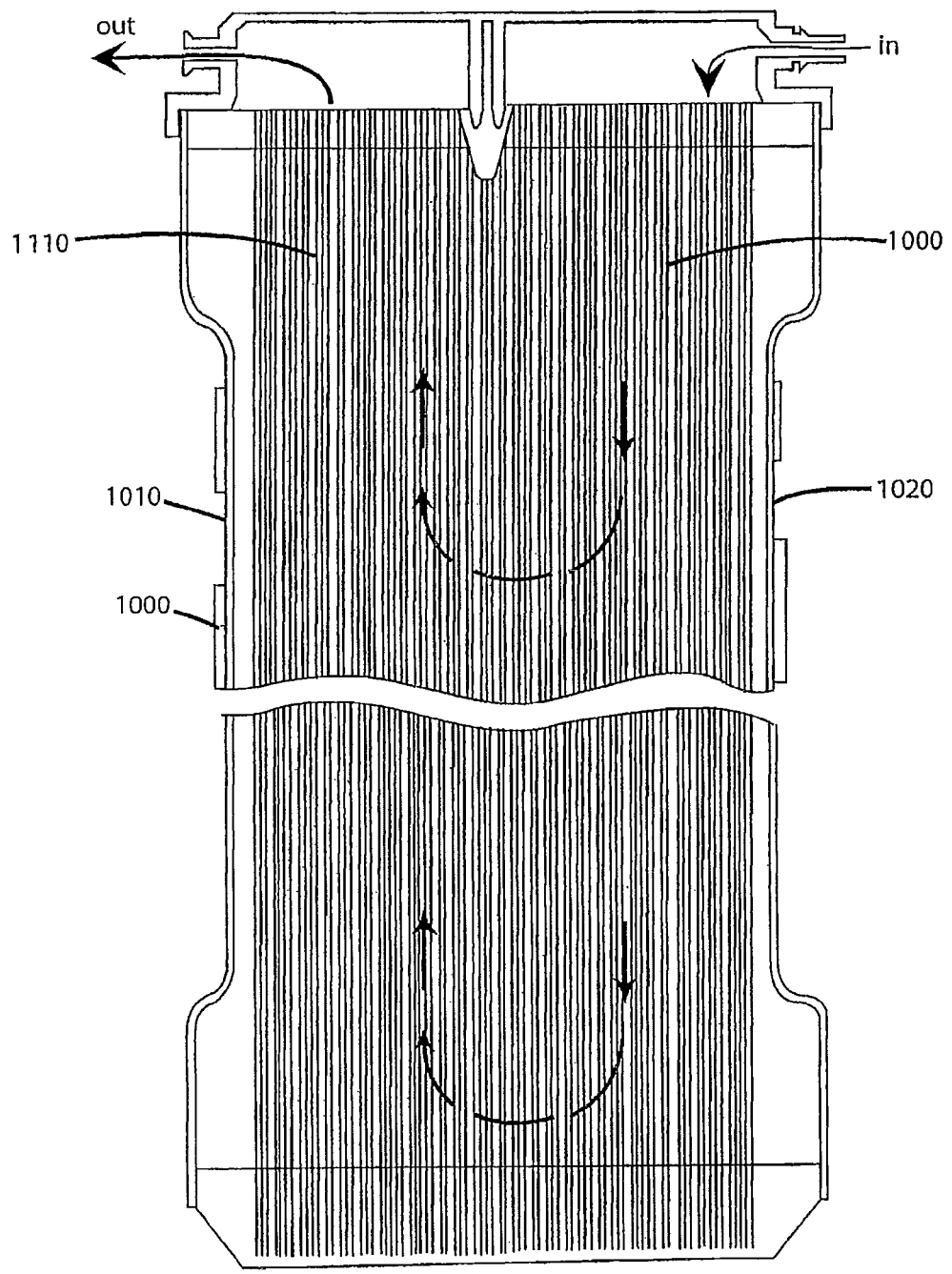
FIG. 28 is a cross-sectional view of a dual-stage ultrafilter apparatus with a visual verification feature.

Accordingly, the pump 940 can be of any type, such as a hand operated pump as shown in FIG. 28, a hand operated diaphragm pump, or another type of pump that is suitable for the intended application. It will be appreciated that pump 40 can be located in an easily accessible area of the pack 900, such as a front pocket, to enable the user to remove the pump 940 and begin transferring the fluid from the first bladder 920, through the purification unit 950, and into the second bladder 930 while the user is walking.

The water purification device 950 is of the type that is constructed to receive raw, un-purified water and purifies the raw water as it passes through the device 950 so as to generate purified water that is suitable for an end use, such as drinking. In other words, the water purification device 950 typically has some type of filtering means or the like that is contained therein and is constructed to purify the raw water by any number of different filtering techniques.

The illustrated water purification device 950 includes a housing 952 that contains filter elements 954, such as semipermeable filter membranes. The housing 952 includes a first end and an opposing second end with a first header cap 953 disposed at the first end and a second header cap 955 disposed at the second end. The first header cap 953 has an inlet port 957 formed as a part thereof that is fluidly connected to the second end of the pump outlet conduit 946 for receiving raw (un-purified) water and has an internal divider or partitioning member 959 that partitions the inner space of the first header cap 953 into a first section (inner section) and a second section (outer section). In the case of a circular cartridge as the unit 950, the inner and outer sections are concentric sections with the second (outer) section being in the form of an annular ring around the circular inner section—thus, in this case, the partitioning member 959 is ring shaped.

As described below in more detail with respect to other embodiments, the filtering elements 954 are contained in a first potting compound at the first end with all of the filtering elements 954 being opened at this first end. The filtering elements 954 are contained in a second potting compound at the second end with all of the filtering elements 954 being closed at the second end.

The inlet port 957 is in fluid communication with only the inner section of the header cap 953 and therefore, the raw fluid is introduced only into an inner core of filtering elements 954 that are open with respect to the inner section of the header cap 953. The raw water travels within the lumens of the inner core filtering elements 954 (first stage) and then is filtered across the membranes into a space outside the filtering elements 954 so as to form once filtered water and then due to the dual stage aspect of the device 950, the once filtered water is then forced across the membranes of the filtering elements 954 of the outer section (second stage) and into the lumens thereof so as to produce twice filtered water which then flows in the lumens of the filtering elements 954 of the outer section toward the first end where the twice filtered water flows into the outer section of the first header cap 953.

The first header cap 953 has an outlet port 961 formed as a part thereof and in communication with the outer section thereof so that only twice filtered water that flows from the outer ring of filtering elements 954 into the outer section of the header cap 953 is able to flow through the outlet port 961. This dual stage filtration is accomplished by effectively capping off the second end of the filtering elements and dividing the filtering elements 954 into a first stage bundle and a second stage bundle and arranging the water flow path as described and shown. It will be understood that it is not necessary to have a dual stage filtration arrangement and a single stage filtration arrangement can easily be provided by only having filtering elements 954 belonging to a single stage. For example, after the raw water is filtered across the membrane of the filtering elements 954 to form once filtered water, this water can then be directed to the outlet port 961 where it is then routed to the second bladder 930 as opposed to being filtered again by interaction with another bundle of filtering elements 954.

The outlet port 961 is in fluid communication with a second conduit 960 that is in fluid communication with the second bladder 930 for storing purified water from the water purification unit or device 950. While not being limited to the illustrated embodiment, the second conduit 960 has a first end 962 that connects to an inlet port 932 of the second bladder 930 to permit purified water to enter and be stored in the second bladder 930. A second end 964 of the second conduit 960 includes a drinking spout or the like 964 that is operable for dispensing a select amount of purified water. For example, a valve type mechanism can be used at location 964 to permit the purified water to be dispensed under the control of the user. In the illustrated embodiment, the coupling of the second conduit 960 to the water purification device 950 includes the use of a connector (e.g., T shaped connector) since the purified water is not delivered from the outlet port 961 into one of the ends of the second conduit 960 but rather is delivered to an intermediate location.

Figure 25:
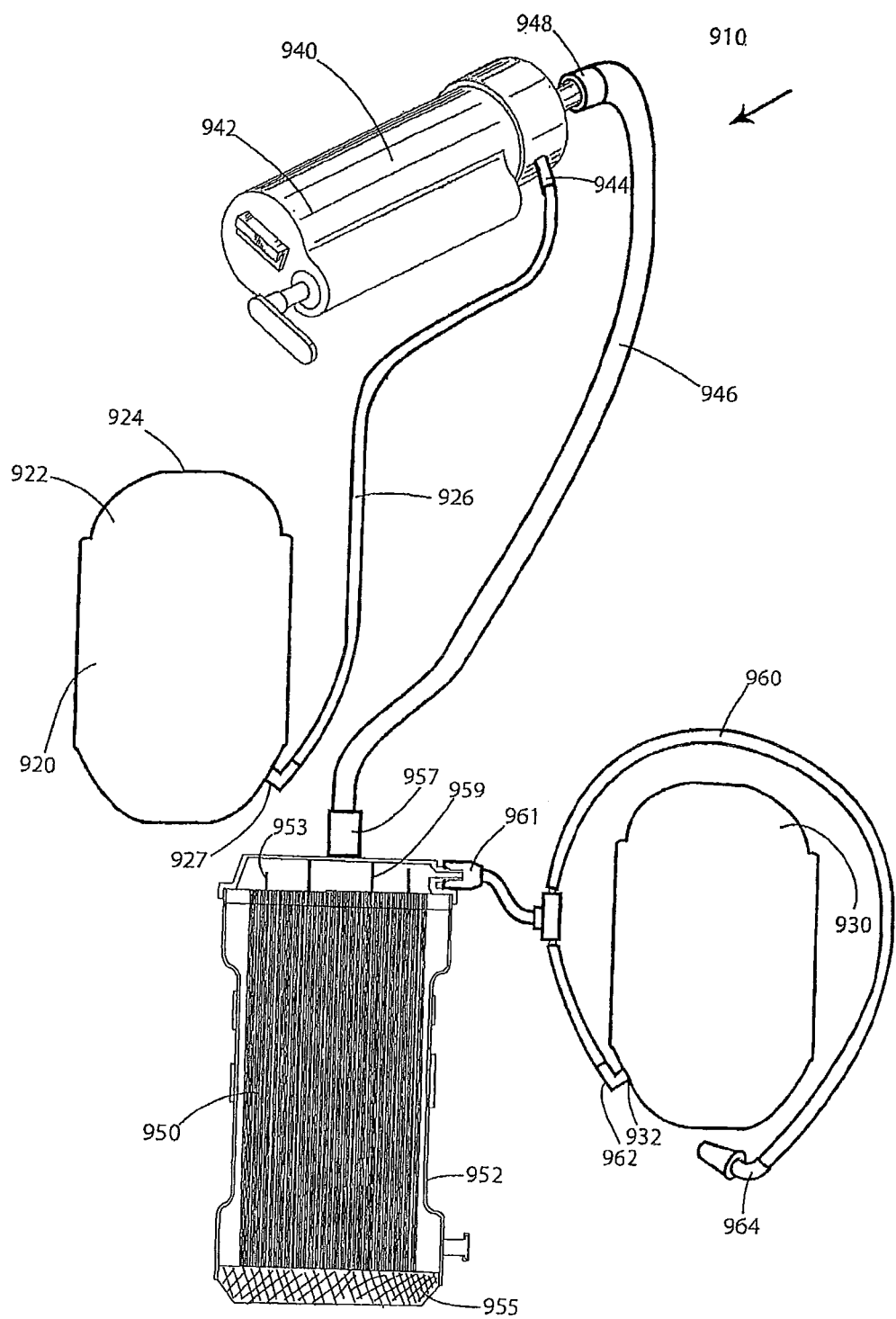
FIG. 25 is an exploded, partial, perspective view of the internal components of the hydration pack of FIG. 24A.

It will be understood that the water purification unit 950 can contain a filter (e.g., can contain semi-permeable membranes—"filtering elements 954") and/or an adsorptive type filter medium, such as activated carbon, or it can contain multiple filtration stages, such as those shown in FIG. 25, for added safety or it can be any combination of filtration and adsorptive elements. Sample water purification units that contain multiple filtration stages are disclosed in commonly assigned U.S. Pat. Nos. 6,635,179 and 6,719,907 and U.S. patent application Ser. No. 60/734,006, all of which are hereby incorporated by reference in their entireties.

In addition, it will be appreciated that the purification unit 950 can have one or more "quick-connect" fittings to make it easy to replace the unit 950 when necessary or desired. In other words, the connections between the first and second conduits and the water purification unit 950 can each have a "quick-connect" fitting. Also, it will be understood that the fittings can be such that without the water purification unit 950 in place, the fluid circuit cannot be completed, which therefore makes it impossible to transfer un-purified water from the first bladder 920 and the second bladder 930. In other words, the fittings on the ends or any connectors of the conduits do not complement one another and therefore, the free end of the first conduit can not be simply connected to the second conduit so as to link the two fluidly together and permit water pumped by means of pump 40 to flow directly from the first bladder 920 to the second bladder 930.

There are a number of advantages offered by the hydration pack 900 of the present invention, with one being that the hydration pack 10 offers a design where a user can quickly and easily fill the first bladder 920 with an un-purified water and therefore minimize the time the user may be exposed to danger. Then while walking or hiking to a next location, or upon getting to a safe location, the user can operate the fluid transfer pump and pump the fluid from the first bladder 920 through the purification device 950 and into the second storage bladder 940.

Figure 26:
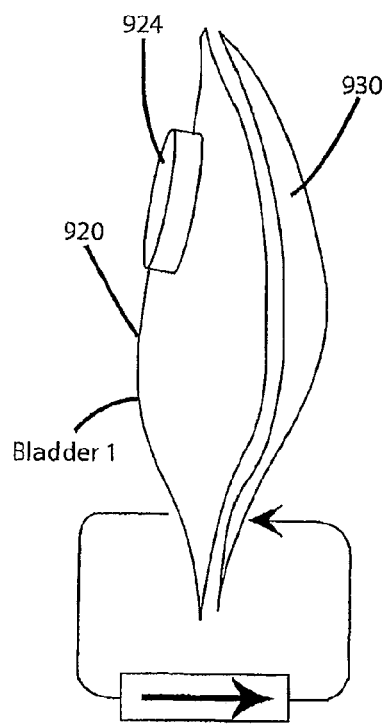
FIG. 26 is a schematic view of first and second bladders in a first condition and that are part of the internal components of the hydration pack of FIG. 24A.
Figure 27:
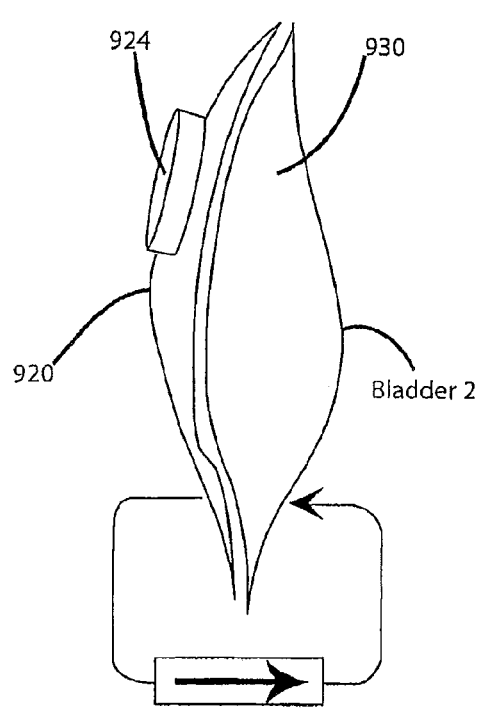
FIG. 27 is a schematic view of the first and second bladders of FIG. 26 in a second condition.

The second bladder 930 does not have an unscrewable inlet port cap such that one can not accidentally fill the second bladder with an un-purified water. According to one embodiment of the present invention and as illustrated in FIGS. 26-27, both the first and second bladders 920, 930 occupy a given space in the hydration pack 910 such that as the first bladder 920 empties, it simultaneously fills the second bladder 930 and thereby occupying the same space. The flow direction is also indicated in FIGS. 26-27 in which initially FIG. 26 shows the initial condition where the first bladder 920 is filled with raw water and then under action of the pump 930, the raw water flows from the first bladder 920 to the water purification unit 950 and then into the second bladder 930 for inflation thereof, while the first bladder 920 becomes compressed.

It will also be appreciated that the first and second bladders 920, 930 can be easily constructed as a single unit, such as by bonding three sheets at the edges such that the middle sheet forms a common wall of each of the first and second bladders 930, 940. Another way to construct the two bladders 930, 940 as a single unit is to make a large single bladder and form a seal down the middle to form two bladder compartments. Then, by folding the bladder along the seal, the two bladder compartments are basically configured as shown above. Also, the same effect can be accomplished by configuring the second bladder 940 completely within the first bladder 930.

It will further be understood that the purification device 950 (filtration device or unit) and the pumping unit 940 can be provided as an integral unit that is contained in a single cartridge or the like as described in U.S. patent application No. 60/714,058, which is hereby incorporated by reference in its entirety.

The dual stage ultrafilter apparatus (cartridge) 100 with pumping means is shown in FIG. 1 and is suitable for use in the hydration pack 910. Since the details and operation of the ultrafilter apparatus 100 has been described in detail above, it is not described again in detail. As mentioned, the housing 110 defines a primary filtration stage 120 and a redundant filtration stage 130, with at least a portion of the housing typically being generally cylindrically shaped and containing a longitudinal bundle of semi-permeable hollow fibers 140. The semi-permeable hollow fibers 140 serve as a means for filtering out bacteria, endotoxins, and other undesirable foreign matter from the incoming fluid from first bladder 920 resulting in a sterile quality fluid being produced after it passes through the two filtration stages 120, 130. The portable ultrafilter apparatus 100 may be used in any application where a sterile fluid is required or highly desired, including drinking water, fluid for sterilizing medical equipment, etc., bodily cleaning fluid for medical staff, on-line hemodiafiltration, etc., to name just a few exemplary applications. Any number of semi-permeable hollow fibers 140 that are commercially available for this intended purpose may be used.

The dual stage ultrafilter apparatus 100 can be thought of as having a redundant filtration component, as defined by the first and second filtration stages 120, 130, a pump mechanism 210 to cause the fluid to be filtered (raw water from the first bladder 920) to enter and pass through the two filtration stages 120, 130, and optionally, a storage compartment for storing a fluid conduit 220 that serves to deliver the fluid to be filtered from the first bladder 920 (FIG. 25).

In the example of the device 100 of FIGS. 1 and 2, the discharge conduit 196 is connected to or is the second conduit that is fluidly connected at its opposite end to the second bladder 930 since the discharge conduit 196 discharges purified water that is delivered to the second bladder 930. The outlet port (discharge port) 198 is a lower pressure than other locations of the filter and thus, the fluid is caused to flow according to the aforementioned flow path as the fluid entering the fibers 140 of the first section 121 is conducted across two separate fiber membranes in order to flow into the second header space 174 and ultimately through the outlet port 198. The general flow of fluid in the filtration (sterilization) stages 120, 130 is depicted by the arrows. The solid arrows indicate inter-lumen fluid flow, while the broken line indicated flow between the stages 120, 130.

As will be apparent hereinafter, there a number of different pump mechanisms 200 that perform the intended function and therefore, the illustrated pump mechanism 200 is merely exemplary in nature and not limiting in scope of the present invention. The pumping mechanism can take the form of a piston pump or some other type of pump.

Now referring to FIG. 5, the dual stage ultrafilter apparatus 300 is also suitable for use in the hydration pack 910 and since the apparatus 300 has previously been discussed in detail, it is not discussed in great detail again. Instead of having the piston pump mechanism, the apparatus 300 has a pump mechanism 310 that is still a hand operated system similar to the mechanism; however, the pump mechanism 310 is of a bellows type construction and is located at the second end 116 of the housing 110. The bellows construction of the pump mechanism 1310 permit the user to draw fluid from the source and store it in a temporary holding location by expanding the bellows and then conversely, the user discharges the held fluid by simply retracting the bellows back to the closed position. As with the other embodiments, the apparatus 300 is easily incorporated into the hydration pack 910 by hooking up the inlet conduit to the first bladder and hooking up the discharge conduit to the second bladder.

The dual stage ultrafilter apparatus 500 of FIG. 15 can also be incorporated into the hydration pack 910 in a manner similar to the other embodiments described above. In this embodiment, the pump mechanism 510 also includes the lever mechanism 530 that is hand operated for moving water from the first bladder, through the filtration elements and then to the second bladder.

It will therefore be appreciated that any of the dual-stage ultrafilter apparatuses disclosed herein can be used as part of the hydration pack 910.

Figure 29:
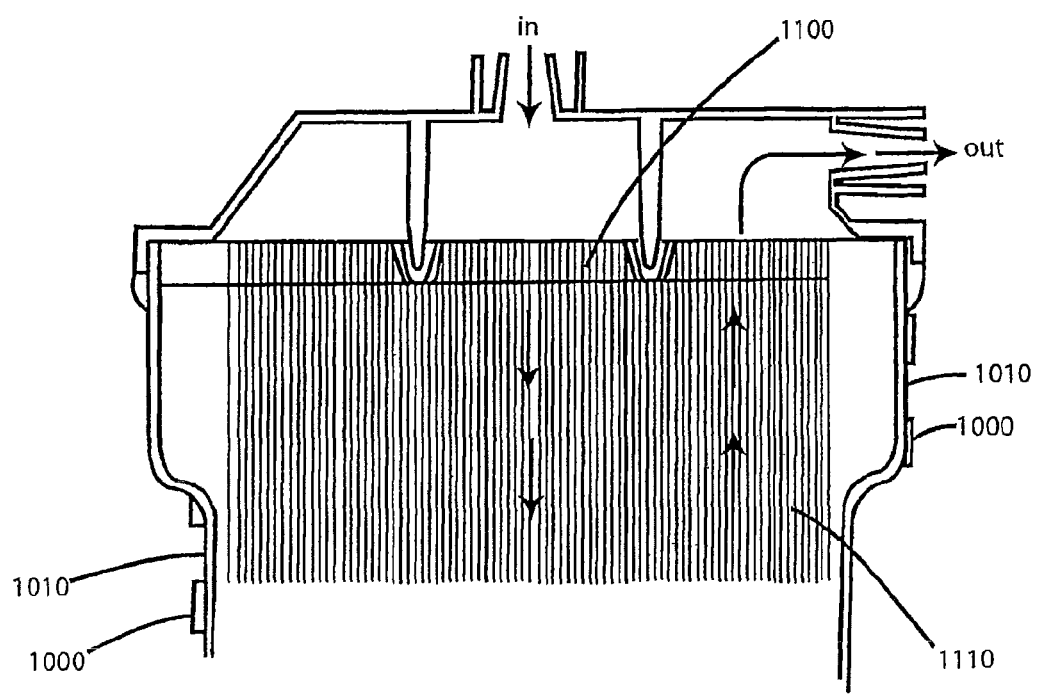
FIG. 29 is a partial cross-sectional view of another dual-stage ultrafilter apparatus with a visual verification feature.

In yet another aspect of the present invention shown in FIGS. 28 and 29, an apparatus is provided and includes a double or dual filtration design such that all of the filtration occurs in a first (or front) section of the filter and the second (or back) section serves a redundant safety filter as disclosed and illustrated herein. The use of the term redundant safety filter refers to its capability to remove similar size particulate or microorganisms from the fluid stream as the first filter stage. It does not imply, however, that its size or surface area is equal to that of the first filter stage. The filter includes a feature that is constructed to permit visual verification of filter integrity and in particular, the feature is at least configured to permit visual inspection of at least a portion of the filter media (e.g., semi-permeable membranes) associated with the second filter stage and located inside of the housing of the apparatus. By visually inspecting the filter media of the second filter stage, the user can determine if the apparatus is in good working order based on whether there is any discoloration in the second filter stage.

More specifically, during the course of operation, the inlet area of the filter apparatus is likely to become discolored indicating that it is filtering particulate out of the water. This results since most particulate has an associated color which is visible when the particulate is captured on the filter. The outlet area of the filter apparatus will remain "white" (or show no color change) indicating that only purified water is passing through it and the first filter stage is working as intended. Periodic checking of the outlet section (or area) for visual discoloration provides an indication that a breach occurred in the first filter stage and the particulate in the water is being filtered by the second filter stage. Though the water is still purified by the second filter stage, it is recommended that the filter be replaced. This ensures a safe and reliable source of ultrapure water is provided by taking advantage of the redundant dual stage filter design feature. The specific details of the visual inspection feature of the present invention are described below with reference to a number of different embodiments each having a first primary filter stage and a second redundant filter stage.

In one embodiment, the casing of the filtration device is formed of a transparent or translucent material, such as a transparent or translucent plastic, that allows visual examination of the filter media (the two fiber bundles) inside the casing. However, it is often not desired to permit a full view of the filter media inside the casing and/or due to regulatory guidelines or advertising and identification demands, a label 1000 (see FIGS. 28 and 29) is provided and is disposed on the exterior surface of the casing. The label 1000 can include product information, as well as other identifying information and directions, etc. The presence of the label 1000 obscures one or more of the fiber bundles and many times, the label 1000 covers at least a portion of both the first and second fiber bundles.

In accordance with the present invention, the feature is in the form of at least an outlet window 1010 (e.g., a cutout) that is formed in the label 1000 and is disposed over the second bundle of fibers to permit easy visual inspection of the underlying second bundle of fibers. The precise location of the outlet window 1010 is not critical so long as the second bundle of fibers is visible through the outlet window 1010.

In addition, the shape and size of the outlet window 1010 is not critical so long as the outlet window 1010 permits visual inspection of the underlying second bundle of fibers. The outlet window 1010 can thus be in the form of a square or rectangular opening or cutout formed through the label 1000 or can be in the form of an opening having another shape, such as a circle, oval, etc.

The label 1000 can have an inlet window 1020 (e.g., a cutout) that is disposed over the first bundle of fibers to permit easy visual inspection of the underlying first bundle of fibers. The precise location of the inlet window 1020 is not critical so long as the first bundle of fibers is visible through the inlet window 1020. In addition, the shape and size of the inlet window 1020 is not critical so long as the inlet window 1020 permits visual inspection of the underlying first bundle of fibers. The inlet window 1020 can thus be in the form of a square or rectangular opening formed through the label 1000 or can be in the form of an opening having another shape, such as a circle, oval, etc.

FIGS. 28 and 29 illustrate embodiments of a dual-stage filter apparatus that can be used as stand-a-lone units or can be incorporated into one of the previously described products, including the hydration pack 910 or one of the portable pump mechanisms. In FIG. 28, the apparatus 1000 includes a first filtration stage 1100 where the fluid is initially filtered and a second redundant filtration stage 1110 where redundant filtration occurs. The arrows show the flow path of the fluid. The operations of the apparatus is the same or similar to the earlier embodiments and is therefore not described in any detail. In FIG. 29, the apparatus includes first and second filtrations stages 1100, 1110, as well as the label 1000 that includes an outlet window 1010.

Alternatively, the casing is formed of an opaque material with the exception of at least an outlet window being formed as part of the casing similar to the outlet window 1010 described above with respect to the label 1000. The outlet window portion of the casing is formed of a transparent or translucent material to permit visual inspection of the underlying second bundle of fibers that is part of the second filter stage. Once again, the precise location of the outlet window is not critical so long as the second bundle of fibers is visible through the outlet window. In addition, the shape and size of the outlet window is not critical so long as the outlet window permits visual inspection of the underlying second bundle of fibers. The outlet window can thus have a square or rectangular shape or it can have another shape, such as a circle, oval, etc. In addition and in combination with the outlet window, the opaque casing can have a transparent or translucent inlet window that permits visual inspection of the underlying first bundle of fibers that is part of the first filter stage. In this embodiment, the windows are not in the form of cutouts but instead are solid windows formed of a transparent or translucent material surrounded by opaque material.

In yet another aspect and in either the embodiment where the label 1000 is disposed on the casing or when one or more windows are formed as part of an opaque casing, a magnification sheet or the like can be provided for magnifying the underlying second bundle of fibers to better permit the user to better determine if the underlying second bundle of fibers has an discoloration due to a breach of the first filter. In the case of using the label 1000 on the casing, the magnification sheet is disposed across the outlet window (cutout) formed in the label 1000 or in the case where the casing is formed of an opaque material, the magnification sheet can be disposed over the outlet window of the casing.

As discussed previously, the outlet window, as well as the optional inlet window, allows visual examination of the filter media (second bundle of fibers) inside the housing (casing). During the course of operation, the inlet area (first bundle of fibers) of the filter media is likely to become discolored indicating that it is filtering particulate out of the water, while the outlet area (second bundle of fibers) remains "white" or shows no color change indicating that only purified water is passing through it and the first filter stage (first fiber bundle) is working as intended.

It will be appreciated that when an inlet window is provided for the checking the operation of the first filter stage, the first bundles of fibers should be formed of a transparent or translucent material since the particulate is captured and collected in the inner lumens of the fibers and therefore, in order to see the discoloration attributed to the collected particulate, the user must be able to see the inside of the fibers through the inlet window. In contrast, the second filter stage works in an opposite manner in that any particulate that may be present in the second filter stage due to a breach or the like of the first filter stage is collected on the outside of the bundle of second fibers. Thus, the bundle of second fibers does not have to be transparent or translucent since the particulate material collects on the outside thereof; however, in many cases, the use of transparent or translucent fibers does make it easier to detect the discoloration relative to "white" background.

Periodic checking of the outlet window for visual discoloration provides an indication that a breach occurred in the first filter stage (first fiber bundle) and the particulate in the water is being filtered by the second filter stage (second fiber bundle).

Advantageously, the provision of at least an outlet window as part of the dual stage filtration apparatus permits the easy visual verification of the filter integrity and does not require the addition of "marker" particles or dyes to the fluid stream being filtered nor does it require an additional sensor to detect filter failure but rather is based on the natural presence of particulate in the water being filtered and a visual inspection.

The provision of both inlet and outlet windows as part of label 1000 or as part of the casing in close proximity to one another permits the user to easily compare the color of the underlying fibers in the two different stages and thus, permits the user to see how the discoloration appears in the first filter stage and then compare and see if there is any appearance of discoloration in the second filter stage.

It will also be appreciated that the label 1000 can be incorporated into any of the previous dual stage filtration devices, such as the devices of FIGS. 1-27. For example, in the case of the device 100 of FIG. 1, the first and second filtration stages are simply reversed so that the second redundant filtration stage is the outermost stage that is adjacent the inner casing wall itself.

While the present invention has been described in terms of sterilizing a fluid and in particular an aqueous solution, such as unfiltered water, it will be understood that the present apparatuses can be equally used to redundantly filter other fluids, including other liquids besides water or mixtures of fluids.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

All references, publications, pending and issued patents are herein each incorporated by reference in their entirety.

What is claimed is:

1. A hand held dual-stage filtration cartridge comprising: a cartridge including a housing having a first sterilization stage including first semi-permeable filtering elements and a second sterilization stage including second semipermeable filtering elements, the housing having a first end and a second end with the first end including a fluid inlet port and a fluid outlet port and a member that divides the housing into the first sterilization stage and the second sterilization stage, the first semi-permeable filtering elements surrounding the second semi-permeable filtering elements and being formed adjacent a side wall of the housing, the fluid inlet port being in fluid communication only with the first sterilization stage, while the fluid outlet port is in fluid communication only with the second sterilization stage, wherein the first and second semi-permeable filtering elements are sealed at the second end of the housing so as to cause the fluid entering the fluid inlet port to flow within lumen sections of the first semi-permeable filtering elements and then be filtered by being conducted across the first semi-permeable filtering elements and then subsequently being filtered again by being conducted across the second semi-permeable filtering elements and into the lumen sections of the second semi-permeable filtering elements prior to being discharged through the fluid outlet port; and an integral shower head disposed at the first end of the housing, the integral shower head being in fluid communication with both the fluid inlet port and the fluid outlet port for discharging twice filtered fluid, wherein the integral shower head includes an integral external inlet port that is external to the housing and disposed along an axis parallel to a longitudinal axis of the housing and for connection to a conduit that delivers the fluid to the fluid inlet port of the housing, the integral shower head being defined by a header cap that is disposed adjacent the housing and divides the housing into the first and second sterilization stages, header cap having an inner wall structure that defines the fluid inlet port and fluid outlet port, wherein the integral shower head is defined by a plurality of openings formed through the header cap to permit external discharge of the filtered fluid, the plurality of openings being formed along axes that are parallel to longitudinal axes of the second semi-permeable filtering elements to permit the filtered fluid to flow axially through the second semi-permeable filtering elements, out of the fluid outlet port and through the integral shower head, wherein the external inlet port is integrally formed with the header cap and depends therefrom and extends along a side wall of the housing.

2. The dual-stage filtration cartridge of claim 1, wherein the inner wall structure of the integral shower head defines an inner header space between a header end wall of the header cap and first ends of the first and second semi-permeable filtering elements, the inner wall structure dividing the inner header space into a first inner header space and a second inner header space, the fluid inlet port being in fluid communication only with the first inner header space while the fluid outlet port is in fluid communication only with the second inner header space.

3. The dual-stage filtration cartridge of claim 2, wherein the first and second inner header spaces are concentric with respect to one another.

4. The dual-stage filtration cartridge of claim 2, further including:

a first potting compound disposed at the first ends of the first and second semipermeable filtering elements, the first potting compound permitting fluid communication between the first inner header space and the first semipermeable filtering elements as well as between the second inner header space and the second semi-permeable filtering elements; and a second potting compound at the second ends of the first and second semipermeable filtering elements for sealing off the second ends thereof.

5. The dual-stage filtration cartridge of claim 1, wherein the fluid enters the first stage and is discharged from the second stage at the same end of the housing.

6. The dual-stage filtration cartridge of claim 3, wherein a first connector is provided in fluid communication with the external inlet port and thus is in fluid communication with the first header space and is adapted to be fluidly connected to a source of the fluid via a second connector.

7. The dual-stage filtration cartridge of claim 6, wherein each of first and second connectors is of a quick release type.

8. The dual-stage filtration cartridge of claim 2, wherein the integral external inlet port is in the form of a hollow handle member extending along an external side surface of the housing therefrom with a fluid conduit being defined therethrough for carrying fluid from a source to the first header space.

9. The dual-stage filtration cartridge of claim 8, further including: a conduit attachment for fluidly connecting a first conduit that carries the fluid from the source to a distal connector of the handle member, the conduit attachment having a clamp that is adapted to receive and hold a portion of the handle.

* * * * *